United States Patent
Vedaie et al.

(10) Patent No.: US 11,947,506 B2
(45) Date of Patent: Apr. 2, 2024

(54) METHOD AND SYSTEM FOR MAPPING A DATASET FROM A HILBERT SPACE OF A GIVEN DIMENSION TO A HILBERT SPACE OF A DIFFERENT DIMENSION

(71) Applicant: 1QB Information Technologies Inc., Vancouver (CA)

(72) Inventors: Seyed Shakib Vedaie, Vancouver (CA); Ehsan Zahedinejad, Vancouver (CA); Roohollah Ghobadi, Vancouver (CA); Daniel J. Crawford, Vancouver (CA); Jaspreet S. Oberoi, Vancouver (CA); Inderpreet Singh, Vancouver (CA); Moslem Noori, Vancouver (CA)

(73) Assignee: 1QB INFORMATION TECHNOLOGIES, INC., Vancouver (CA)

( * ) Notice: Subject to any disclaimer, the term of this patent is extended or adjusted under 35 U.S.C. 154(b) by 143 days.

(21) Appl. No.: 17/553,551

(22) Filed: Dec. 16, 2021

(65) Prior Publication Data

US 2022/0107927 A1 Apr. 7, 2022

Related U.S. Application Data

(63) Continuation of application No. PCT/IB2020/055801, filed on Jun. 19, 2020.
(Continued)

(51) Int. Cl.
*G06F 16/22* (2019.01)
*G06N 10/40* (2022.01)

(52) U.S. Cl.
CPC .............. *G06F 16/22* (2019.01); *G06N 10/40* (2022.01)

(58) Field of Classification Search
None
See application file for complete search history.

(56) References Cited

U.S. PATENT DOCUMENTS

| 6,221,592 B1 | 4/2001 | Schwartz et al. |
| 7,113,967 B2 | 9/2006 | Cleve et al. |
| (Continued) | | |

FOREIGN PATENT DOCUMENTS

| CA | 2840958 A1 | 1/2013 |
| CA | 2881033 A1 | 4/2015 |
| (Continued) | | |

OTHER PUBLICATIONS

Aggarwal et al.: Evolutionary network analysis: A survey. ACM Computing Surveys 47(1):10:1-10:36 (2014).
(Continued)

*Primary Examiner* — Baoquoc N To
(74) *Attorney, Agent, or Firm* — Wilson Sonsini Goodrich & Rosati

(57) ABSTRACT

A computer-implemented method is disclosed for mapping a dataset from a Hilbert space of a given dimension to a Hilbert space of a different dimension, the method comprising obtaining a dataset, for each data sample of the dataset, for a plurality of episodes, generating an encoded sample; configuring an adiabatic quantum device by embedding each encoded sample into a q-body Hamiltonian H representative of an adiabatic quantum device, causing the adiabatic quantum device to evolve from an initial state to a final state; and performing a projective measurement along z axis at the final state to determine the value of each qubit; generating a corresponding binary vector representative of the given data sample in a transformed Hilbert space using the determined
(Continued)

value of each qubit at each episode and providing a mapped dataset comprising each of the generated corresponding binary vectors.

20 Claims, 7 Drawing Sheets

Related U.S. Application Data

(60) Provisional application No. 62/925,488, filed on Oct. 24, 2019, provisional application No. 62/863,510, filed on Jun. 19, 2019.

(56) References Cited

U.S. PATENT DOCUMENTS

| | | | |
|---|---|---|---|
| 7,135,701 | B2 | 11/2006 | Amin et al. |
| 7,234,144 | B2 | 6/2007 | Wilt et al. |
| 7,418,283 | B2 | 8/2008 | Amin et al. |
| 7,533,068 | B2 | 5/2009 | Maassen et al. |
| 7,619,437 | B2 | 11/2009 | Thom et al. |
| 7,639,035 | B2 | 12/2009 | Berkley |
| 7,660,533 | B1 | 2/2010 | Meyers et al. |
| 7,805,079 | B1 | 9/2010 | Meyers et al. |
| 7,898,282 | B2 | 3/2011 | Harris et al. |
| 7,984,012 | B2 | 7/2011 | Coury et al. |
| 8,008,942 | B2 | 8/2011 | Van et al. |
| 8,126,649 | B2 | 2/2012 | Frasch et al. |
| 8,175,995 | B2 | 5/2012 | Amin |
| 8,195,596 | B2 | 6/2012 | Rose et al. |
| 8,195,726 | B2 | 6/2012 | Macready et al. |
| 8,219,605 | B2 | 7/2012 | Cowlishaw et al. |
| 8,230,432 | B2 | 7/2012 | Bryant et al. |
| 8,244,504 | B1 | 8/2012 | Jacobs |
| 8,244,662 | B2 | 8/2012 | Coury et al. |
| 8,283,943 | B2 | 10/2012 | Van et al. |
| 8,374,828 | B1 | 2/2013 | Jacobs et al. |
| 8,421,053 | B2 | 4/2013 | Bunyk et al. |
| 8,503,885 | B2 | 8/2013 | Meyers et al. |
| 8,655,828 | B2 | 2/2014 | Rose |
| 8,832,165 | B2 | 9/2014 | Allen et al. |
| 9,537,953 | B1 | 1/2017 | Dadashikelayeh et al. |
| 9,660,859 | B1 | 5/2017 | Dadashikelayeh et al. |
| 9,727,824 | B2 | 8/2017 | Rose et al. |
| 9,870,273 | B2 | 1/2018 | Dadashikelayeh et al. |
| 9,881,256 | B2 | 1/2018 | Hamze et al. |
| 10,044,638 | B2 | 8/2018 | Dadashikelayeh et al. |
| 10,152,358 | B2 | 12/2018 | Dadashikelayeh et al. |
| 10,223,084 | B1 | 3/2019 | Dunn |
| 10,339,466 | B1 | 7/2019 | Ding et al. |
| 10,346,748 | B2 | 7/2019 | Aspuru-Guzik et al. |
| 10,484,479 | B2 | 11/2019 | Johnson et al. |
| 10,558,932 | B1 | 2/2020 | Neven et al. |
| 10,614,370 | B2 | 4/2020 | Johnson et al. |
| 10,713,582 | B2 | 7/2020 | Dadashikelayeh |
| 10,824,478 | B2 | 11/2020 | Dadashikelayeh et al. |
| 10,826,845 | B2 | 11/2020 | Dadashikelayeh et al. |
| 10,929,294 | B2 | 2/2021 | Brahm et al. |
| 11,017,289 | B2 | 5/2021 | Crawford et al. |
| 11,196,775 | B1 | 12/2021 | Badawy et al. |
| 11,205,275 | B2 | 12/2021 | Oami et al. |
| 11,514,134 | B2 | 11/2022 | Ronagh et al. |
| 2003/0005068 | A1 | 1/2003 | Nickel et al. |
| 2003/0121028 | A1 | 6/2003 | Coury et al. |
| 2004/0254735 | A1 | 12/2004 | Horn et al. |
| 2004/0267916 | A1 | 12/2004 | Chambliss et al. |
| 2005/0027458 | A1 | 2/2005 | Merz et al. |
| 2005/0182614 | A1 | 8/2005 | Meredith |
| 2005/0187844 | A1 | 8/2005 | Chalermkraivuth et al. |
| 2005/0250651 | A1 | 11/2005 | Amin et al. |
| 2005/0273306 | A1 | 12/2005 | Hilton et al. |
| 2006/0221978 | A1 | 10/2006 | Venkatachalam |
| 2006/0225165 | A1 | 10/2006 | Maassen van den Brink et al. |
| 2007/0177634 | A1 | 8/2007 | Beausoleil et al. |
| 2007/0180586 | A1 | 8/2007 | Amin |
| 2007/0215862 | A1 | 9/2007 | Beausoleil et al. |
| 2007/0239366 | A1 | 10/2007 | Hilton et al. |
| 2008/0059547 | A1 | 3/2008 | Taylor |
| 2008/0065573 | A1 | 3/2008 | Macready |
| 2008/0186918 | A1 | 8/2008 | Tinnakornsrisuphap et al. |
| 2008/0215850 | A1 | 9/2008 | Berkley et al. |
| 2008/0218519 | A1 | 9/2008 | Coury et al. |
| 2008/0262990 | A1 | 10/2008 | Kapoor et al. |
| 2008/0313430 | A1 | 12/2008 | Bunyk |
| 2009/0050357 | A1 | 2/2009 | Suzuki |
| 2009/0070402 | A1 | 3/2009 | Rose et al. |
| 2009/0078932 | A1 | 3/2009 | Amin |
| 2009/0164435 | A1 | 6/2009 | Routt |
| 2009/0182542 | A9 | 7/2009 | Hilton et al. |
| 2009/0306902 | A1 | 12/2009 | Lemmen et al. |
| 2009/0325694 | A1 | 12/2009 | Beckman et al. |
| 2010/0076913 | A1 | 3/2010 | Yang et al. |
| 2010/0261481 | A1 | 10/2010 | Resende et al. |
| 2010/0306142 | A1 | 12/2010 | Amin |
| 2011/0047201 | A1 | 2/2011 | Macready et al. |
| 2011/0231462 | A1 | 9/2011 | Macready et al. |
| 2011/0238378 | A1 | 9/2011 | Allen et al. |
| 2011/0238855 | A1 | 9/2011 | Korsunsky et al. |
| 2011/0296229 | A1 | 12/2011 | Cowlishaw et al. |
| 2012/0072579 | A1 | 3/2012 | Teather |
| 2012/0084242 | A1 | 4/2012 | Levin |
| 2012/0159506 | A1 | 6/2012 | Barham et al. |
| 2012/0215821 | A1 | 8/2012 | Macready et al. |
| 2012/0240185 | A1 | 9/2012 | Kapoor et al. |
| 2012/0253926 | A1 | 10/2012 | Chen et al. |
| 2012/0254586 | A1 | 10/2012 | Amin et al. |
| 2012/0278374 | A1 | 11/2012 | Cowlishaw et al. |
| 2012/0326720 | A1 | 12/2012 | Gambetta et al. |
| 2013/0026183 | A1 | 1/2013 | Foster |
| 2013/0144925 | A1 | 6/2013 | Macready et al. |
| 2013/0263131 | A1 | 10/2013 | Beda, III et al. |
| 2013/0308956 | A1 | 11/2013 | Meyers et al. |
| 2013/0336472 | A1 | 12/2013 | Fahlgren et al. |
| 2014/0025606 | A1 | 1/2014 | Macready |
| 2014/0067808 | A1 | 3/2014 | Narang et al. |
| 2014/0122702 | A1 | 5/2014 | Jung et al. |
| 2014/0123325 | A1 | 5/2014 | Jung et al. |
| 2014/0187427 | A1 | 7/2014 | Macready et al. |
| 2014/0214257 | A1 | 7/2014 | Williams et al. |
| 2014/0250288 | A1 | 9/2014 | Roy |
| 2014/0258730 | A1 | 9/2014 | Stecher |
| 2014/0324933 | A1 | 10/2014 | Macready et al. |
| 2014/0337612 | A1 | 11/2014 | Williams |
| 2014/0344322 | A1 | 11/2014 | Ranjbar |
| 2014/0379924 | A1 | 12/2014 | Das et al. |
| 2015/0006443 | A1 | 1/2015 | Rose et al. |
| 2015/0032991 | A1 | 1/2015 | Lanting et al. |
| 2015/0032993 | A1 | 1/2015 | Amin et al. |
| 2015/0055961 | A1 | 2/2015 | Meyers et al. |
| 2015/0106413 | A1 | 4/2015 | Ronagh |
| 2015/0111754 | A1 | 4/2015 | Harris et al. |
| 2015/0120551 | A1 | 4/2015 | Jung et al. |
| 2015/0120555 | A1 | 4/2015 | Jung et al. |
| 2015/0142398 | A1 | 5/2015 | Miller, III et al. |
| 2015/0169746 | A1 | 6/2015 | Hatami-Hanza |
| 2015/0178349 | A1 | 6/2015 | Niewodniczanski et al. |
| 2015/0193692 | A1 | 7/2015 | Israel |
| 2015/0205759 | A1 | 7/2015 | Israel et al. |
| 2015/0220852 | A1 | 8/2015 | Hatami-Hanza |
| 2015/0227559 | A1 | 8/2015 | Hatami-Hanza |
| 2015/0262074 | A1 | 9/2015 | Bruestle et al. |
| 2015/0269124 | A1 | 9/2015 | Hamze et al. |
| 2015/0269243 | A1 | 9/2015 | Kobayashi |
| 2015/0332994 | A1 | 11/2015 | Mallik et al. |
| 2015/0349960 | A1 | 12/2015 | Bagley |
| 2015/0358251 | A1 | 12/2015 | Varga et al. |
| 2015/0363358 | A1 | 12/2015 | Ronagh et al. |
| 2015/0363708 | A1 | 12/2015 | Amin et al. |
| 2016/0026183 | A1 | 1/2016 | Williams et al. |
| 2016/0071021 | A1 | 3/2016 | Raymond |
| 2016/0132785 | A1 | 5/2016 | Amin et al. |
| 2016/0162798 | A1 | 6/2016 | Marandi et al. |
| 2016/0171368 | A1 | 6/2016 | Aspuru-Guzik et al. |
| 2016/0224515 | A1 | 8/2016 | Ronagh et al. |

(56) References Cited

U.S. PATENT DOCUMENTS

| | | | |
|---|---|---|---|
| 2016/0321559 A1 | 11/2016 | Rose et al. | |
| 2016/0328253 A1 | 11/2016 | Majumdar | |
| 2016/0328659 A1 | 11/2016 | Mohseni et al. | |
| 2016/0338075 A1 | 11/2016 | McKibben | |
| 2016/0342891 A1 | 11/2016 | Ross et al. | |
| 2017/0011305 A1 | 1/2017 | Williams | |
| 2017/0017894 A1 | 1/2017 | Lanting et al. | |
| 2017/0060642 A1 | 3/2017 | Castellano et al. | |
| 2017/0109605 A1 | 4/2017 | Ahn | |
| 2017/0147303 A1 | 5/2017 | Amy et al. | |
| 2017/0147695 A1 | 5/2017 | Shih | |
| 2017/0214701 A1 | 7/2017 | Hasan | |
| 2017/0223143 A1 | 8/2017 | Johnson et al. | |
| 2017/0242824 A1 | 8/2017 | Karimi et al. | |
| 2017/0255592 A1 | 9/2017 | Karimi et al. | |
| 2017/0255629 A1 | 9/2017 | Thom et al. | |
| 2017/0255872 A1 | 9/2017 | Hamze et al. | |
| 2017/0286852 A1 | 10/2017 | Rezaie et al. | |
| 2017/0286858 A1 | 10/2017 | La et al. | |
| 2017/0300808 A1 | 10/2017 | Ronagh et al. | |
| 2017/0323195 A1 | 11/2017 | Crawford et al. | |
| 2017/0344898 A1 | 11/2017 | Karimi et al. | |
| 2017/0351974 A1 | 12/2017 | Rose et al. | |
| 2017/0372427 A1 | 12/2017 | Johnson et al. | |
| 2017/0373940 A1 | 12/2017 | Shahab et al. | |
| 2018/0014970 A1 | 1/2018 | Conde De Paiva et al. | |
| 2018/0039903 A1 | 2/2018 | Mosca et al. | |
| 2018/0091440 A1 | 3/2018 | Dadashikelayeh et al. | |
| 2018/0096085 A1 | 4/2018 | Rubin | |
| 2018/0107526 A1 | 4/2018 | Dadashikelayeh et al. | |
| 2018/0114138 A1 | 4/2018 | Monroe et al. | |
| 2018/0204126 A1 | 7/2018 | Galle | |
| 2018/0218279 A1 | 8/2018 | Lechner et al. | |
| 2018/0218281 A1 | 8/2018 | Reinhardt et al. | |
| 2018/0246851 A1 | 8/2018 | Zaribafiyan et al. | |
| 2018/0260730 A1 | 9/2018 | Reagor et al. | |
| 2018/0267937 A1 | 9/2018 | Pelc et al. | |
| 2018/0308007 A1 | 10/2018 | Amin et al. | |
| 2018/0314970 A1 | 11/2018 | Harris et al. | |
| 2019/0009581 A1 | 1/2019 | Schalk et al. | |
| 2019/0095811 A1 | 3/2019 | Antonio et al. | |
| 2019/0205790 A1 | 7/2019 | Dukatz et al. | |
| 2019/0251213 A1 | 8/2019 | Bishop et al. | |
| 2019/0370680 A1* | 12/2019 | Novotny | G06N 10/00 |
| 2019/0378047 A1 | 12/2019 | Pistoia et al. | |
| 2020/0005186 A1 | 1/2020 | Romero et al. | |
| 2020/0057957 A1 | 2/2020 | Johnson et al. | |
| 2020/0090072 A1 | 3/2020 | Troyer et al. | |
| 2020/0104740 A1 | 4/2020 | Cao | |
| 2020/0125568 A1 | 4/2020 | Idicula et al. | |
| 2020/0143910 A1 | 5/2020 | Noori et al. | |
| 2020/0191943 A1 | 6/2020 | Wu et al. | |
| 2020/0272683 A1 | 8/2020 | Ronagh et al. | |
| 2020/0272684 A1 | 8/2020 | Karimi et al. | |
| 2020/0279187 A1 | 9/2020 | Huang et al. | |
| 2020/0364597 A1 | 11/2020 | Friedlander et al. | |
| 2020/0364601 A1 | 11/2020 | Yamazaki et al. | |
| 2020/0394537 A1 | 12/2020 | Wang et al. | |
| 2020/0401920 A1 | 12/2020 | Killoran et al. | |
| 2020/0410343 A1 | 12/2020 | Niu et al. | |
| 2021/0103847 A1 | 4/2021 | Akzam | |
| 2021/0166133 A1 | 6/2021 | Ronagh et al. | |
| 2021/0166148 A1 | 6/2021 | Matsuura et al. | |
| 2021/0279260 A1 | 9/2021 | Oberoi et al. | |
| 2021/0287124 A1 | 9/2021 | Ronagh et al. | |
| 2021/0289020 A1 | 9/2021 | Rolfe et al. | |
| 2021/0374611 A1 | 12/2021 | Ronagh et al. | |
| 2023/0067878 A1 | 3/2023 | Ronagh et al. | |
| 2023/0077665 A1 | 3/2023 | Kuttimalai et al. | |
| 2023/0104058 A1 | 4/2023 | Hopfmueller et al. | |

FOREIGN PATENT DOCUMENTS

| | | |
|---|---|---|
| CA | 2902015 A1 | 1/2016 |
| CA | 2921711 A1 | 8/2017 |
| CA | 3026824 A1 | 12/2017 |
| CN | 106874506 A | 6/2017 |
| CN | 110069348 A | 7/2019 |
| EP | 3113084 A1 | 1/2017 |
| JP | 2004503011 A | 1/2004 |
| JP | 2006061926 A | 3/2006 |
| JP | 2008525873 A | 7/2008 |
| JP | 2013114366 A | 6/2013 |
| JP | 2016206795 A | 12/2016 |
| WO | WO-2005122052 A1 | 12/2005 |
| WO | WO-2006026985 A2 | 3/2006 |
| WO | WO-2007089674 A2 | 8/2007 |
| WO | WO-2007147243 A1 | 12/2007 |
| WO | WO-2010148120 A2 | 12/2010 |
| WO | WO-2013006836 A1 | 1/2013 |
| WO | WO-2014210368 A1 | 12/2014 |
| WO | WO-2015006494 A1 | 1/2015 |
| WO | WO-2015060915 A2 | 4/2015 |
| WO | WO-2015121619 A2 | 8/2015 |
| WO | WO-2016029172 A1 | 2/2016 |
| WO | WO-2017033326 A1 | 3/2017 |
| WO | WO-2017068228 A1 | 4/2017 |
| WO | WO-2017111937 A1 | 6/2017 |
| WO | WO-2017145086 A1 | 8/2017 |
| WO | WO-2017149491 A1 | 9/2017 |
| WO | WO-2017152289 A1 | 9/2017 |
| WO | WO-2017168865 A1 | 10/2017 |
| WO | WO-2017201626 A1 | 11/2017 |
| WO | WO-2017214717 A1 | 12/2017 |
| WO | WO-2018119522 A1 | 7/2018 |
| WO | WO-2018160599 A1 | 9/2018 |
| WO | WO-2019104440 A1 | 6/2019 |
| WO | WO-2019104443 A1 | 6/2019 |
| WO | WO-2019152020 A1 | 8/2019 |
| WO | WO-2019157228 A1 | 8/2019 |
| WO | WO-2019222748 A1 | 11/2019 |
| WO | WO-2019241879 A1 | 12/2019 |
| WO | WO-2019244105 A1 | 12/2019 |
| WO | WO-2020113339 A1 | 6/2020 |
| WO | WO-2020223718 A1 | 11/2020 |
| WO | WO-2020227825 A1 | 11/2020 |
| WO | WO-2020255076 A1 | 12/2020 |
| WO | WO-2021055000 A1 | 3/2021 |
| WO | WO-2021111368 A1 | 6/2021 |
| WO | WO-2021181281 A1 | 9/2021 |
| WO | WO-2021207847 A1 | 10/2021 |
| WO | WO-2021237350 A1 | 12/2021 |
| WO | WO-2021243454 A1 | 12/2021 |
| WO | WO-2022079640 A1 | 4/2022 |
| WO | WO-2022123494 A1 | 6/2022 |
| WO | WO-2022224143 A1 | 10/2022 |
| WO | WO-2023275825 A1 | 1/2023 |
| WO | WO-2023053035 A1 | 4/2023 |

OTHER PUBLICATIONS

Akama et al. Implementation of divide-and-conquer method including Hartree-Fock exchange interaction. J Comput Chem 28(12):2003-2012 (2007).

Alidaee et al. Solving the maximum edge weight clique problem via unconstrained quadratic programming. European Journal of Operational Research 181(2):592-597 (2007).

Amelio et al.: Community mining in signed networks: A multiobjective approach. ASONAM 2013: Proceedings of the 2013 IEEE/ACM International Conference on Advances in Social Networks Analysis and Mining, pp. 95-99 https://doi.org/10.1145/2492517.2492641 (2013).

Amin et al.: Quantum Boltzmann Machine. arXiv reprint arXiv:1601.02036 [1-10] 2016.

Anchuri et al.: Communities and balance in signed networks: A spectral approach. In Proceedings of the 2012 International Conference on Advances in Social Networks Analysis and Mining (ASONAM 2012), ASONAM 2012, pp. 235-242, Washington, DC, USA (2012).

Anthony et al. Quadratization of symmetric pseudo-Boolean functions. Discrete Appl. Math. 203:1-12 (2016).

(56) References Cited

OTHER PUBLICATIONS

Aspuru-Guzik et al. Simulated Quantum Computation of Molecular Energies. Science 309:1704 (2005).
Assad et al. The quadratic minimum spanning tree problem. Naval Research Logistics 39:399-417(1992).
Babbush et al. Resource Efficient Gadgets for Compiling Adiabatic Quantum Optimization Problems. arXiv:1307.8041v1 [quant-ph] (pp. 1-11) (Jul. 2013) Retrieved from the Internet: (https://arxiv.org/pdf/1307.8041.pdf5).
Babbush. Towards Viable Quantum Computation for Chemistry, 2015, [Retrieved on Feb. 27, 2020]. Retrieved from the internet: <url: <a=""href="https://pdfs.sennanticscholar.org/aff0/5ecf5f58c2206c923b767d76bed7f43b2a66.pdf">https://pdfs.sennanticscholar.org/aff0/5ecf5f58c2206c923b767d76bed7f43b2a66.pdf? ga=2.2412147.276222377.1582743768639821531.1551220934 376 Pages (1376) (2015).</url:>.
Barends et al. Digitized adiabatic quantum computing with a superconducting circuit. Nature 534(7606):222-226 (2016).
Bartak et al. Constraint Satisfaction Techniques for Planning and Scheduling Problems (Coplas-15), Jul. 6, 2015. Retrieved on Nov. 17, 2019 at https://www.cs.bgu.ac.il/-icapsl5/workshops/Proceedings%2000PLAS%202015.pdf (pp. 1-41) (2015).
Beasley. Integer programming solution methods. Available at URL: http://people.brunel.ac.uk/-mastjjb/jeb/natcor_ip_rest.pdf (20 pgs.) (2011).
Berry et al. Simulating Hamiltonian dynamics with a truncated Taylor series. Phys Rev Lett 114(9):090502 (2015).
Bertoni et al. Quantum logic gates based on coherent electron transport in quantum wires. Physical Review Letters 84(25):5912 (2000).
Bhagat et al.: Node Classification in Social Networks. arXiv:1101.3291v1 Social Network Data Analytics, pp. 115-148 (2011).
Bian et al. The Ising model: teaching an old problem new tricks. D-Wave Systems 2 (32 pgs.) (2010).
Bojchevski et al.: Deep Gaussian Embedding of Graphs: Unsupervised Inductive Learning via Ranking. arXiv.org, Cornell University, arXiv:1707.03815v4 [stat.ML], pp. 1-13 (2018).
Boros et al. On quadratization of pseudo-Boolean functions. arXiv:1404.6538v1 [math.OC] (11 pgs.) (2014).
Boros et al. Pseudo-boolean optimization. Discrete Applied Mathematics 123(1):155-225 (2002).
Bravyi et al. Fermionic quantum computation. arXiv:quant-ph/0003137 (2000).
Bromley et al.: Applications of near-term photonic quantum computers: software and algorithms. Quantum Science and Technology 5:034010DOI:10.1088/2058-9565/ab8504 arXiv:1912.07634 [1-36] (2019).
Burrell: An Introduction to Quantum Computing using Cavity QED concepts. arXiv preprint arXiv:1210.6512 (2012).
Byrnes et al. Macroscopic quantum computation using Bose-Einstein condensates. arXiv preprint quantum-ph/1103.5512 (2011).
Cai et al. A practical heuristic for finding graph minors.arXiv:1406.2741 [quant-ph] (16 pgs) (2014).
Cai et al.: A survey on network community detection based on evolutionary computation. International Journal of Bio-Inspired Computation 8(2):84-98 (2016).
Cao et al.: Advances in Knowledge Discovery and Data Mining. Springer International, pp. 82-95 (2015).
Carleo et al.: Constructing exact representations of quantum many-body systems with deep neural networks. Nat Commun. 9(1):5322, pp. 1-11 doi:10.1038/s41467-018-07520-3 (2018).
Carleo et al.: Solving the quantum many-body problem with artificial neural networks. pre-print arXiv:1606.02318 Science 355(6325):602-606 doi:10.1126/science.aag2302 (2016).
Carrasquilla et al.: Reconstructing quantum states with generative models. arXiv:1810.10584 Nature Machine Intelligence 1(3):155-161 arXiv:1810.10584 (2019).
Carrasquilla. Machine learning for quantum matter. https://arxiv.org/pdf/2003.11040.pdf (2020).

Chen et al.: Community Detection via Maximization of Modularity and Its Variants. IEEE Transactions on Computational Social Systems 1(1):46-65 DOI:10.1109/TCSS.2014.2307458 (2014).
Chen et al.: Epidemic spreading on networks with overlapping community structure. Physica A: Statistical Mechanics and its Applications 391(4):1848-1854 (2012).
Chiang et al.: Exploiting longer cycles for link prediction in signed networks. In Proceedings of the 20th ACM International Conference on Information and Knowledge Management, CIKM 2011, pp. 1157-1162, New York, NY, USA [1-6] (2011).
Choi. Minor-embedding in adiabatic quantum computation: I. The parameter setting problem. Quantum Information Processing 7(5):193-209 (2008).
Chowdhury et al.: Quantum algorithms for Gibbs sampling and hitting-time estimation. arXiv:1603.02940 Quant. Inf. Comp. 17(1-2):41-64 (2017).
Chuang et al.: Experimental implementation of fast quantum searching. Physical Review Letters 80(15):3408-3411 DOI:10.1103/PhysRevLett.80.3408 (1998).
Clarke et al. Superconducting quantum bits. Nature 453(7198):1031 (2008).
Conforti et al.: Integer Programming: Graduate Texts in Mathematics 271. Springer [1-466] (2014).
Conway et al. An FPGA-based instrumentation platform for use at deep cryogenic temperatures. arxiv.org/abs/1509.06809 (2015).
Cory et al. Nuclear magnetic resonance spectroscopy: An experimentally accessible paradigm for quantum computing. arXiv preprint quant-ph/97090 01(1997).
Cowtan et al. On the qubit routing problem. arXiv:1902.08091v2 (2019).
Cramer et al. Efficient quantum state tomography, Nature Communications 1:149 (2010).
Debnath et al.: Demonstration of a small programmable quantum computer with atomic qubits. arXiv:1603.04512 Nature 536(7614):63-66 doi:10.1038/nature18648 (2016).
Deutsch et al. Quantum computing with neutral atoms in an optical lattice. arXiv preprint quant-ph/0003022 Fortschritte der Physik Progress of Physics; Oct. 2000, vol. 48, No. 9-11, pp. 925-943 (2000).
Durr et al. A Quantum Algorithm for Finding the Minimum. arXiv:quant-ph/9607014 (1996).
Dwave, Reverse Quantum Annealing for Local Refinement of Solutions, D-Wave Whitepaper Series, Nov. 9, 2017. Retrieved online on Aug. 14, 2019 from https://www.dwavesys.com/sites/default/files/14-1018A-A_Reverse_Quantum_Annealing_for_Local_Refinement_Of_Solutions.pdf (2 pgs.).
Elvira et al.: Efficient Multiple Importance Sampling Estimators. pre-print arxiv.org/pdf/1505.05391, pp. 1-7 (2015).
EP17812349.3 Third Party Observations dated Oct. 29, 2020.
Esmailian et al.: Mesoscopic analysis of online social networks: The role of negative ties. arXiv:1411.6057v1 Phys. Rev. E90:042817, pp. 1-13 (2014).
Farhi et al. A Quantum Approximate Optimization Algorithm. arXiv:1411.4028 (2014).
Farhi et al. Quantum Adiabatic Evolution Algorithms versus Simulated Annealing.arXiv.org:quant ph/0201031 pp. 1-16 (2002).
Farhi et al. Quantum computation by adiabatic evolution. arXiv preprint quant-ph/0001106 (24 pgs) (2000).
Fedichkin et al. Novel coherent quantum bit using spatial quantization levels in semiconductor quantum dot. arXiv preprint quant-ph/0006097 (2000).
Fedorov et al. Exploring chemistry with the fragment molecular orbital method. Physical Chemistry Chemical Physics 14:7562-7577 (2012).
Ferrara et al.: Detecting criminal organizations in mobile phone networks. arXiv:1404.1295v1 Expert Systems with Applications 41(13):5733-5750 (2014).
Fortunato: Community detection in graphs. arXiv.org, Cornell University, arXiv:0906.0612v1 [physics.soc-ph], pp. 1-89 (2009).
Freund. Applied Lagrange Duality for Constrained Optimization. Massachusetts Institute of Technology (pp. 1-35) (2004).

(56) References Cited

OTHER PUBLICATIONS

Gelman et al.: Simulating normalizing constants: from importance sampling to bridge sampling to path sampling. Statist. Sci. 13(2):163-185 DOI:10.1214/ss/1028905934 (1998).
Geoffrion. Lagrangean relaxation for integer programming. Mathematics Programming Study 2, North-Holland Publishing Company (pp. 1-34) (1974).
Glover et al. Polynomial unconstrained binary optimisation Part 1, 2011, [Retrieved on Feb. 27, 2020]. Retrieved from the internet: <url: <a=""href="http://leedsfaculty.colorado.edu/glover/fred%2Opubs/424%20%20%20Polynonnial">http://leedsfaculty.colorado.edu/glover/fred%2Opubs/424%20%20%20Polynonnial 25 Pages (231256) (2011).</url:>.
Glover et al.: Tabu Search: Modern Heuristic Techniques for Combinatorial Problems. Colin R. Reeves (Ed.) Black Scientific Publications, Oxford [1-62] (1993).
Glover: Tabu search—part II. ORSA Journal on computing 2(1):4-32.1 4-32 DOI:10.1287/ijoc.2.1.4 (1990).
Greene et al. Simulated annealing without rejected moves. IEEE Transactions on Computer-Aided Design of Integrated Circuits and Systems 5(1):221-228 (1986).
Grover. A fast quantum mechanical algorithm for database search. Proceedings of the 28th Annual ACM Symposium on the Theory of Computing (pp. 212-219) (1996).
Gwennap: Groq Rocks Neural Networks. The Linley Group Microprocessor Report www.groq.com/groq-tsp-leads-in-inference-performance/ [1-5] (2020).
Hamilton et al.: Representation Learning on Graphs: Methods and Applications. arXiv.org, Cornell University, arXiv:1709.05584v3 [cs.SI], pp. 1-24 (2018).
Harneit. Spin Quantum Computing with Endohedral Fullerenes. arXiv preprint arXiv:1708.09298 (2017).
He et al.: MISAGA: An Algorithm for Mining Interesting Subgraphs in Attributed Graphs. IEEE Transactions on Cybernetics 48(5):1369-1382 (2018).
Heider: Attitudes and cognitive organization. The Journal of Psychology 21(1):107-112 (1946).
Huang et al.: Predicting many properties of a quantum system from very few measurements. Nature Physics 16(10)1050-1057 doi:arxiv.org/abs/2002.08953 [1-40](2020).
Hukushima et al. Exchange Monte Carlo Method and Application to Spin Glass Simulations. Journal of the Physical Society of Japan 65:1604 (1996).
Humble et al.: Software Systems for High-performance Quantum Computing. IEEE Xplore doi:10.1109/HPEC.2016.7761628 [1-8](2016).
Imamoglu et al.: Quantum information processing using quantum dot spins and cavity QED. Phys. Rev. Lett.; Nov. 1999, vol. 83, No. 20, pp. 4204-4207 http://134.34.147.128/burkard/sites/default/files/images/Imamoglu_Phys.%20Rev.%20Lett._1999-01-01.pdf (1999).
Ishikawa. Transformation of General Binary MRF Minimization to the First-Order Case. IEEE Transactions on Pattern Analysis and Machine Intelligence. 33(6):1234-1249 (2011).
Izmaylov et al.: Revising the measurement process in the variational quantum eigensolver: is it possible to reduce the number of separately measured operators? Chem Sci. 10(13):3746-3755 (2019).
Johnson et al. Quantum annealing with manufactured spins. Nature 473(7346):194-198 (2011).
Jones et al.: Implementation of a quantum algorithm to solve Deutsch's problem on a nuclear magnetic resonance quantum computer. arXiv:quant-ph/9801027v2 The Journal of chemical physics, 109(5):1648-1653 DOI:10.1063/1.476739 (1998).
Jordan. Fast Quantum Algorithm for Numerical Gradient Estimation. Physical Review Letters 95:050501 (2015).
Kaminsky et al.: Scalable architecture for adiabatic quantum computing of NP-hard problems. Quantum Computing & Quantum Bits in Mesoscopic Systems, pp. 229-236 DOI:10.1007/978-1-4419-9092-1_25 [arXiv:quant-ph/0211152 1-10] (2004).
Kane. A silicon-based nuclear spin quantum computer. Nature 393(6681):133 (1998).
Karimi et al. A subgradient approach for constrained binary programming via quantum adiabatic evolution. arXiv preprint arXiv:1605.09462 (16 pgs.) (2016).
Karimi et al. Boosting quantum annealer performance via quantum persistence. Online publication eprint arXiv:1606.07797 (Jun. 27, 2027 and updated Aug. 30, 2016). Accessed May 17, 2017 and available from https://www.arxiv.org/pdf/1606.07797.pdf (25 pgs).
Kassal et al.: Simulating chemistry using quantum computers. Annu Rev Phys Chem. 62:185-207 (2011).
Katzgraber et al. Seeking quantum speedup through spin glasses: the good, the bad, and the ugly. Physical Review 5(3):031026 (2015).
Kellerer et al. Knapsack Problems. Springer (15 pgs.) (2004).
Kempe et al.: The Complexity of the Local Hamiltonian Problem. SIAM Journal of Computing. 35(5):1070-1097 Rev.2008 DOI: arXiv:quant-ph/0406180v2 [1-30] (2005).
Kielpinski et al. Architecture for a large-scale ion-trap quantum computer. Nature 417(6890):709 (2002).
Kirkpatrick et al. Optimization by simulated annealing. Science 220:671-680 (1983).
Kitaura et al. Fragment molecular orbital method: an approximate computational method for large molecules. Chemical Physics Letters 313(3-4):701-706 (1999).
Knill et al. Efficient linear optics quantum computation. arXiv preprint quant-ph/0006088 (2000).
Knizia et al. Density Matrix Embedding: A Simple Alternative to Dynamical Mean-Field Theory. Phys Rev Lett 109:186404 (2012).
Kobayashi et al. Chapter 5: Divide-and-conquer approaches to quantum chemistry: Theory and implementation, in Linear-Scaling Techniques in Computational Chemistry and Physics: Methods and Applications, edited by Zalesny et al. (Springer Netherlands, Dordrecht, 2011) pp. 97-127.
Kochenberger et al.: The unconstrained binary quadratic programming problem: A survey. J Comb Optim. 28(1)58-81 DOI:10.1007/s10878-014-9734-0 (2014).
Kokail et al. Self-verifying variational quantum simulation of lattice models. Nature 569(7756):355-360 (2019).
Konda et al. Actor-Critic Algorithms. Advances in Neural Information Processing Systems. pp. 1008-1014 (2000).
Kunegis et al.: The slashdot zoo: Mining a social network with negative edges. In Proceedings of the 18th International 20 Conference on World Wide Web, WWW 2009, pp. 741-750, New York, NY, USA DOI:10.1145/1526709.1526809 (2009).
Lemieux et al.: Efficient Quantum Walk Circuits for Metropolis-Hastings Algorithm. Quantum 4:287 [1-15] (2020).
Lemieux et al.: Resource estimate for quantum many-body ground-state preparation on a quantum computer. Physical Review A 103(5)052408 DOI:10.1103/PhysRevA.103.052408 [1-9] (2021).
Lenstra: Integer programming with a fixed number of variables. 8(4):538-548 URL: https://doi.org/10.1287/moor.8.4.538 (1983).
Leskovec et al.: Empirical Comparison of Algorithms for Network Community Detection. Proceedings of International World Wide Web Conference 2010, Raleigh, North Carolina, USA, pp. 1-10 (2010).
Leskovec et al.: Predicting positive and negative links in online social networks. In Proceedings of the 19th International Conference on World Wide Web, WWW 2010, pp. 1-10, New York, NY, USA (2010).
Leuenberger et al. Quantum computing in molecular magnets. arXiv preprint cond-mat/0011415 (2001).
Levit et al. Free energy-based reinforcement learning using a quantum processor. Available at https://arxiv.org/pdf/1706.00074.pdf (May 2017) (8 pgs.).
Leyffer. Deterministic Methods for Mixed Integer Nonlinear Programming. University of Dundee (pp. 1-60 and pp. 1-58) (1993).
Li et al. Nonlinear Integer Programming. New York, NY (pp. 1-452) (2006).
Li: Tackling the Qubit Mapping Problem for NISQ-Era Quantum Devices. arXiv:1809.02573v2 Proceedings of the Twenty-Fourth International Conference on Architectural Support for Programming Languages and Operating Systems. (2019).
Liben-Nowell et al.: The link prediction problem for social networks. In Proceedings of the Twelfth International Conference on

(56) References Cited

OTHER PUBLICATIONS

Information and Knowledge Management, CIKM 2003, pp. 556-559, New York, NY, USA [1-19](2004).
Lin et al.: Understanding community effects on information diffusion. Advances in Knowledge Discovery and Data Mining, pp. 82-95 DOI:10.1007/978-3-319-18038-0_7 (2015).
Low et al.: Hamiltonian simulation by Qubitization. arXiv:1610.06546v3 Quantum 3:163 URL:https://doi.org/10.22331/q-2019-07-12-163 [1-23] (2019).
Lu et al.: Demonstration of Shor's quantum factoring algorithm using photonic qubits. arXiv:0705.1684v3 Physical Review Letters 99(25):250504 DOI:10.1103/PhysRevLett.99.250504 [1-5] (2007).
Lu et al.: KKT Solution and Conic Relaxation for Solving Quadratically Constrained Quadratic Programming Problem. Siam J. Optim. 21(4):1475-1490 DOI:10.1137/100793955 (2011).
Lu et al., Quantum chemistry simulation on quantum computers: theories and experiments. Physical Chemistry Chemical Physics 14(26):9411-9420 (2012).
Lyon. Spin-based quantum computing using electrons on liquid helium. arXiv preprint cond-mat/030158 1 (2006).
Martinis et al. Rabi oscillations in a large Josephson-junction qubit. Physical Review Letters 89:117901 (2002).
Marx et al. Chapter 1. Setting the stage: why ab initio molecular dynamics? In Ab Initio Molecular Dynamics: Basic Theory and Advanced Methods. Cambridge, UK Cambridge University Press (pp. 1-8) (2009).
Massa et al.: Controversial users demand local trust metrics: An experimental study on Epinions.com community. In Proceedings of the 20th National Conference on Artificial Intelligence AAA Press vol. 1, AAAI-05:121-126 (2005).
Matsuura et al. VanQver: The Variational and Adiabatically Navigated Quantum Eigensolver. New Journal of Physics 22:053023 (2020).
McClean et al. The Theory Of Variational Hybrid Quantum-Classical Algorithms, Institute of Physics. New Journal of Physics 18:023023. Retrieved online on Aug. 14, 2019 from https://iopscience.iop.org/article/10.1088/1367-2630/18/2/023023/ampdf (21 pgs) (2016).
McGeoch et al. Experimental Evaluation of an Adiabatic Quantum System for Combinatorial Optimization. Computing Frontiers. Proceeding CF '13 Proceedings of the ACM International Conference on Computing Frontiers. Article No. 23. Available at http://www.cs.amherst.edu/ccm/cf14-mcgeoch.pdf (11 pgs) (May 14-16, 2013).
McKiernan et al. Automated quantum programming via reinforcement learning for combinatorial optimization. Quantum Physics. arXiv.org quant-ph arXiv:1908.08054 (2019).
Medus et al.: Detection of community structures in networks via global optimization. Physica A: Statistical Mechanics and its Applications 358(2-4):593-604 DOI:10.1016/j.physa.2005.04.022 (2005).
Melko et al.: Restricted Boltzmann machines in quantum physics. Nature Physics 15(9):887-892 DOI:10.1038/s41567-019-0545-1 (2019).
Metz. IBM Is Now Letting Anyone Play With Its Quantum Computer. Wired. (5 pgs.) (May 2016).
Mnih et al. Asynchronous Methods for Deep Reinforcement Learning, in International Conference on Machine Learning, pp. 1928-1937 (2016).
Mnih et al. Playing Atari with Deep Reinforcement Learning. arXiv:1312.5602 (2013).
Moll et al., Optimizing qubit resources for quantum chemistry simulations in second quantization on quantum computer. Journal of Physics A: Mathematical and Theoretical 49(29):295301 (2016).
Moll et al.: Quantum optimization using variational algorithms on near-term quantum devices. Quantum Sci. Technol. 3 030503 [1-17] (2018).
Montanaro. Quantum walk speedup of backtracking algorithms. arXiv:1509.02374v2 [quant-ph] (23 pgs) (2015).
Monz et al.: Realization of a scalable Shor algorithm. arXiv:1507.08852 Science 351(6277):1068-1070 DOI:10.1126/science.aad9480 (2015).
Motzkin et al.: Maxima for graphs as a new proof of a theorem of Turan. Canadian Journal of Mathematics 17:533-540 DOI:10.4153/CJM-1965-053-6 (1965).
Nafradi et al. Room temperature manipulation of long lifetime spins in metallic-like carbon nanospheres. Nat Commun 7:12232 (2016).
Nagy et al.: Variational quantum Monte Carlo method with a neural-network ansatz for open quantum systems. Phys Rev Letters 122(25):250501 doi:arxiv.org/abs/1902.09483 [1-10](2019).
Nam et al.: Ground-state energy estimation of the water molecule on a trapped ion quantum computer. arXiv preprint arXiv:1902.10171, pp. 1-14 (2019).
Newman et al.: Finding and evaluating community structure in networks. Phys. Rev. E. 69:026113, pp. 1-16 (2004).
Newman: Modularity and community structure in networks. PNAS 103(23):8577-8582 (2006).
Niklasson et al., Fast method for quantum mechanical molecular dynamics. Physical Review B 86(17):174308 (2012).
Nishikawa et al. Quantum Chemistry Grid/Gaussian Portal, Journal of the twenty second Annual Research Society, Japan Simulation Society, Jun. 18, 2003, pp. 369 to 372 (English Abstract).
Nizovtsev et al. A quantum computer based on NV centers in diamond: optically detected nutations of single electron and nuclear spins. Optics and spectroscopy 99(2):233-244 (2005).
O'Gorman et al. Compiling planning into quantum optimization problems: a comparative study. Proc. of the Workshop on Constraint Satisfaction Techniques for Planning and Scheduling Problems (COPLAS-15) (pp. 11-20) (Jun. 2015) Retrieved from the Internet: <https://www.cs.bgu.acilt--icaps15/workshops/Proceedings%2000PLAS%202015.pdf>.
Ohlsson et al. Quantum computer hardware based on rare-earth-ion-doped inorganic crystals. Optics Communications 201(1-3):71-77 (2002).
Olsson et al.: Solving Large Scale Binary Quadratic Problems: Spectral Methods vs. Semidefinite Programming. IEEE Conference on Computer Vision and Pattern Recognition, pp. 1-8, doi:10.1109/CVPR.2007.383202 (2007).
O'Malley et al. Scalable Quantum Simulation of Molecular Energies. Phys. Rev. X 6:031007 (2016).
Orus. Tensor networks for complex quantum systems. Nature Reviews Physics 1:538 (2019).
Papamakarios: Comparison of Modern Stochastic Optimization Algorithms. Scholar article. [1-13] (2014) www.richtarik.org/papers/Papamakarios.pdf.
PCT/CA2017/050320 International Search Report and Written Opinion dated Jun. 27, 2017.
PCT/CA2017/050637 International Search Report and Written Opinion dated Aug. 25, 2017.
PCT/CA2017/050709 International Search Report and Written Opinion dated Sep. 19, 2017.
PCT/CA2017/051610 International Search Report and Written Opinion dated Mar. 21, 2018.
PCT/CA2018/051531 International Search Report and Written Opinion dated Feb. 20, 2019.
PCT/CA2018/051534 International Search Report and Written Opinion dated Feb. 21, 2019.
PCT/CA2019/050852 International Search Report and Written Opinion dated Aug. 15, 2019.
PCT/CA2019/051752 International Search Report and Written Opinion dated Mar. 17, 2020.
PCT/CA2020/050641 International Search Report and Written Opinion dated Jul. 21, 2020.
PCT/CA2021/050513 International Search Report and Written Opinion dated Jul. 14, 2021.
PCT/CA2021/050709 International Search Report and Written Opinion dated Aug. 3, 2021.
PCT/CA2021/050750 International Search Report and Written Opinion dated Aug. 6, 2021.
PCT/IB2017/051038 International Search Report dated May 16, 2017.
PCT/IB2017/051224 International Search Report dated May 18, 2017.
PCT/IB2019/055226 International Search Report and Written Opinion dated Nov. 26, 2019.

(56) References Cited

OTHER PUBLICATIONS

PCT/IB2020/055801 International Search Report and Written Opinion dated Oct. 30, 2020.
PCT/IB2020/061464 International Search Report and Written Opinion dated Mar. 4, 2021.
PCT/IB2021/051965 International Search Report and Written Opinion dated May 31, 2021.
Peruzzo et al. A variational eigenvalue solver on a quantum processor. arXiv:1304.3061 (2013).
Pizzuti: A multi-objective genetic algorithm for community detection in networks. IEEE International Conference on Tools with Artificial Intelligence, pp. 379-386 DOI:10.1109/ICTAI.2009.58 (2009).
Poulin et al.: Sampling from the thermal quantum Gibbs state and evaluating partition functions with a quantum computer. arXiv:0905.2199 Physical Review Letters 103(22), pp. 1-7 DOI:10.1103/PhysRevLett.103.220502 (2009).
Preskill. Quantum Computing in the NISQ era and beyond. Quantum 2:79 arXiv:1801.00862 (2018).
Quek et al.: Adaptive Quantum State Tomography with Neural Networks. arXiv.org, Cornell University, arXiv:1812.06693v1 [quant-ph], pp. 1-13 pages (2018).
Reiher et al.: Elucidating reaction mechanisms on quantum computers. PNAS USA 114(29):7555-7560 (2017).
Ronagh et al. Solving constrained quadratic binary problems via quantum adiabatic evolution. arXiv preprint arXiv:1509.05001 (20 pgs.) (2015).
Rosenberg et al. Building an iterative heuristic solver for a quantum annealer. Computational Optimization and Applications 65:845 (2016).
Rubin: A Hybrid Classical/Quantum Approach for Large-Scale Studies of Quantum Systems with Density Matrix Embedding Theory. Cornell University Library, Ithaca, NY arXiv doi:arxiv.org/abs/1610.06910 [1-10](2016).
Salathe et al.: Dynamics and control of diseases in networks with community structure. PLOS Computational Biology 6(4):e1000736, pp. 1-11 (2010).
Schmidt et al. General Atomic and Molecular Electronic Structure System. Journal of Computational Chemistry 14:1347-1363 (1993).
Schollwock. The density-matrix renormalization group. Review of Modern Physics 77:259 arxiv.org:cond-mat/0409292 (2004).
Schuld et al., "Quantum machine learning in feature Hilbert spaces", Phys. Rev. Lett.; Feb. 1, 2019, vol. 122, pp. 040504-1-12.
Schulman et al. Proximal Policy Optimization Algorithms. arXiv:1707.06347 (2017).
Schwabl: Quantum Mechanics. Springer, 4th Ed. [1-425] (2007).
Sepehry et al. Smooth Structured Prediction Using Quantum and Classical Gibbs Samplers. Available at https://1qbit.com/wp-content/uploads/2018/09/1QBit-Research-Paper-Smooth_Structured-Prediction-Using-Quantum-And_classical-Giobbs-Samplers.pdf (Accessed Feb. 20, 2018) (32 pgs).
Shapiro et al. A survey of Lagrangean techniques for discrete optimization. Operations Research Center, Massachusetts Institute of Technology, Cambridge, Massachusetts (pp. 1-18 and pp. 1-29) (May 1977).
Shen et al.: Quantum implementation of the unitary coupled cluster for simulating molecular electronic structure. Phys. Rev. A 95, 020501(R) doi:10.1103/PhysRevA.95.020501 [1-6] (2017).
Siraichi et al. Qubit Allocation. CGO 2018—International Symposium on Code Generation and Optimization, Feb. 2018, Vienna, Austria (12 pgs) (2018). pp. 1-12.
Sloss et al. Evolutionary Algorithms Review, arXiv:1906.08870 (2019).
Srinivas et al.: Muiltiobjective optimization using non-dominated sorting in genetic algorithms. Evolutionary Computation 2(3):221-248 (1994).
Sun et al. A single-photon switch and transistor enabled by a solid-state quantum memory. arXiv preprint quant-ph/1805.01964 (2018).
Suzuki. Fractal decomposition of exponential operators with applications to many-body theories and Monte Carlo simulations. Physics Letters A 146(6):319-323 (1990).
Svore et al. Toward a Software Architecture for Quantum Computing Design Tools. QPL 2004, pp. 127-144, Retrieved from the Internet: URL:https://www.microsoft.com/en-us/research/wp-content/uploads/2016/02/10Svore-Cros s-Aho-Chuang-Markov.pdf.
SymPy Python. Internals of the Polynomial Manipulation Module. Available online at http://docs.sympy.org/latest/modules/polys/internals.html (Accessed Jun. 2016) (136 pgs).
Tang et al.: A Survey of Signed Network Mining in Social Media. ACM Computing Surveys 9(4):pp. 39:1 to 39:38, arXiv.org, Cornell University, arXiv:1511.07569v3 [cs.SI] (2016).
Tavares et al. New algorithms for Quadratic Unconstrained Binary Optimization (QUBO) with applications in engineering and social sciences. Rutgers University Community Repository. Dissertation—Retrieved from the Internet <URL: https://rucorelibrariessutgers.edu/rutgers-lib/25771/> on Feb. 2, 2018 (460 pgs) ( May 2008).
Temme et al.: Quantum metropolis sampling. Nature 471(7336):87-90 (2011).
Terhal et al.: The problem of equilibration and the computation of correlation functions on a quantum computer. arXiv:quant-ph/9810063 Phys.Rev. A61:22301, pp. 1-35 DOI:10.1103/PhysRevA.61.022301 (2000).
The D-Wave 2X™ Quantum Computer Technology Overview (12 pgs) (2015).
The D-Wave Quantum Computer. Brochure. D-Wave Systems Inc. 2016. www.dwavesys.com.
Torlai et al.: Neural-network quantum state tomography. pre-print arXiv:1703.05334v2 Nature Physics 14:447-450 DOI:10.1038/s41567-018-0048-5 (2017).
Tran et al. A hybrid quantum-classical approach to solving scheduling problems. AAAI Publications, Ninth Annual Symposium on Combinatorial Search. pp. 98-106 (SoCS 2016).
Tran et al. Explorations of Quantum-Classical Approaches to Scheduling a MarsLander Activity Problem. The Workshops of the Thirtieth AAAI Conference on Artificial Intelligence Planning for Hybrid Systems: Technical Report WS-16-12, p. 641-649, published on Mar. 29, 2016.
Trotter. On the product of semi-groups of operators. Proceedings of the American Mathematical Society 10(4):545-551 (1959).
U.S. Appl. No. 16/811,479 Non-Final Office Action dated Aug. 30, 2021.
U.S. Appl. No. 15/014,576 Office Action dated Dec. 26, 2017.
U.S. Appl. No. 15/014,576 Office Action dated Jul. 10, 2017.
U.S. Appl. No. 15/051,271 Office Action dated Mar. 13, 2018.
U.S. Appl. No. 15/051,271 Office Action dated Nov. 24, 2017.
U.S. Appl. No. 15/165,655 1st Action Interview dated Feb. 24, 2017.
U.S. Appl. No. 15/165,655 1st Action Interview dated Oct. 25, 2016.
U.S. Appl. No. 15/165,655 Office Action dated Jun. 2, 2017.
U.S. Appl. No. 15/486,960 Office Action dated Jun. 22, 2017.
U.S. Appl. No. 15/830,953 Office Action dated Feb. 14, 2018.
U.S. Appl. No. 15/831,967 Office Action dated Feb. 27, 2018.
U.S. Appl. No. 15/900,643 Miscellaneous Communication re: Third Party Submission dated Dec. 14, 2018.
U.S. Appl. No. 16/010,244 Miscellaneous Communication re: Third Party Submission dated Apr. 23, 2019.
U.S. Appl. No. 16/010,244 Office Action dated Dec. 2, 2019.
U.S. Appl. No. 16/010,244 Office Action dated Jun. 10, 2019.
U.S. Appl. No. 16/124,083 Miscellaneous Communication re: Third Party Submission dated Jul. 11, 2019.
U.S. Appl. No. 16/124,083 Office Action dated Jul. 18, 2019.
U.S. Appl. No. 16/124,083 Office Action dated Nov. 21, 2019.
U.S. Appl. No. 16/162,249 Miscellaneous Communication re: Third Party Submission dated May 2, 2019.
U.S. Appl. No. 16/162,249 Office Action dated Dec. 2, 2019.
U.S. Appl. No. 16/162,249 Office Action dated Jun. 12, 2019.
U.S. Appl. No. 16/888,446 3rd Party Submission dated Apr. 7, 2021.
Van Dam et al. How powerful is adiabatic quantum computation Proceedings 42nd IEEE Symposium on Foundations of Computer Science (pp. 279-287) (Oct. 2001).

(56) References Cited

OTHER PUBLICATIONS

Vartiainen: Unitary Transformations for Quantum Computing. Doctoral Dissertation. Helsinki University of Technology TKK dissertations. DOI: aaltodoc.aalto.fi/handle/123456789/2551 [1-56] (2005).
Veis et al.: Quantum computing applied to calculations of molecular energies: CH2 benchmark. J Chem Phys. 133(19):194106 doi:10.1063/1.3503767 [1-29](2010).
Venuti et al.: Adiabaticity in open quantum systems. arXiv:1508.05558v2 Phys. Rev. A93(3):032118, pp. 1-12 DOI:10.1103/PhysRevA.93.032118 (2016).
Vinci et al. Quantum annealing correction with minor embedding. Physical Review A 92.4 (34 pgs) (Jul. 2015).
Wang et al. Population Annealing: Theory and Application in Spin Glasses. Physics Review E 92:961 (2015).
Waskiewicz: Friend of a friend influence in terrorist social networks. In Proceedings on the International Conference on Artificial Intelligence (ICAO, pp. 1-5. The Steering Committee of The World Congress in Computer Science, Computer Engineering and Applied Computing (WorldComp) (2012).
Wendin: Quantum information processing with superconducting circuits: a review. Rep Prog Phys. 80(10):106001 doi:10.1088/1361-6633/aa7e1a [1-50](2017).
White. Density Matrix Formulation for Quantum Renormalization Groups. Physical Review Letters 69:286 (1992).
Whitfield et al., Simulation of electronic structure Hamiltonians using quantum computers. Molecular Physics 109(5):735-750 (2011).
Wigner et al. Paulische equivalence ban. Magazine for physics 47:631 (1928) (English Abstract).
Wooters et al. The no-cloning theorem. Physics Today 62(2):76-77 (2009).
Wouters et al. A Practical Guide to Density Matrix Embedding Theory in Quantum Chemistry. J Chem Theory Comput. 12(6):2706-19 (2016).
Xu et al.: Neural network state estimation for full quantum state tomography. ArXiv preprint doi:arxiv.org/abs/1811.06654 [1-8] (2018).
Yang. Direct calculation of electron density in density-functional theory: Implementation for benzene and a tetrapeptide, Physical Review A 44:(11):7823-7826 (1991).
Zahedinejad et al.: Multi-Community Detection in Signed Graphs Using Quantum Hardware. arXiv.org, 1QBit online research paper, Cornell University, arXiv:1901.04873v1 [quant-ph], pp. 1-10 (2019).
Zimmerman et al. Strong Correlation in Incremental Full Configuration Interaction. Journal of Chemical Physics 146:224104 (2017).
Zulehner et al. Efficient mapping of quantum circuits to the IBM QX architectures. In Design, Automation & Test in Europe Conference & Exhibition 2018 38(7):1226-1236 (2018).
Eidenbenz et al. Quantum Algorithm Implementations for Beginners. https://arxiv.org/abs/1804.03719, arXiv:1804.03719v1 [cs.ET], Apr. 10, 2018, pp. 1-75) (Year: 2018).
Sarma, Abhijat, et al. Quantum Unsupervised and Supervised Learning on Superconducting Processors. ArXiv, 2019, /abs/1909.04226 (2019).
U.S. Appl. No. 16/888,419 Office Action dated Aug. 24, 2023.
U.S. Appl. No. 17/110,729 Office Action dated Sep. 29, 2023.
U.S. Appl. No. 17/254,661 Office Action dated Sep. 18, 2023.
U.S. Appl. No. 18/047,981 Corrected Notice of Allowance dated Aug. 18, 2023.
Aharonov, et al. Adiabatic quantum state generation and statistical zero knowledge. Proceedings of the thirty-fifth annual ACM symposium on Theory of computing. 2003. https://arxiv.org/abs/quant-ph/0301023.
An et al., "Quantum linear system solver based on time-optimal adiabatic quantum computing and quantum approximate optimization algorithm," 2019, arXiv preprint arXiv:1909.05500.
Boixo, et al., "Fast quantum algorithms for traversing paths of eigenstates," 2010, arXiv preprint arXiv:1005.3034, 36 pgs.
Boixo et al., "Quantum state preparation by phase randomization," 2009, arXiv preprint arXiv:0903.1652.
Bombin, et al. Topological quantum distillation. Phys Rev Lett. Nov. 3, 2006;97(18):180501. doi: 10.1103/PhysRevLett.97.180501. Epub Oct. 30, 2006.
Brassard, et al., "An exact quantum polynomial-time algorithm for Simon's problem," Proceedings of the Fifth Israeli Symposium on Theory of Computing and Systems, IEEE, 1997; 12 pgs.
Chamberland et al., Triangular color codes on trivalent graphs with flag qubits. New J. Phys. Feb. 2020. vol. 22 023019. 24 pages. https://doi.org/10.1088/1367-2630/ab68fd.
Co-pending U.S. Appl. No. 18/047,882, inventors Ronagh; Pooya et al., filed Oct. 19, 2022.
Co-pending U.S. Appl. No. 18/053,080, inventor Dadashikelayeh; Majid, filed Nov. 7, 2022.
Co-pending U.S. Appl. No. 18/189,390, inventors Dadashikelayeh; Majid et al., filed Mar. 24, 2023.
Co-pending U.S. Appl. No. 18/297,513, inventors Rosenberg; Gilad Amir et al., filed Apr. 7, 2023.
Co-pending U.S. Appl. No. 18/331,030, inventors Yildiz; Ugur et al., filed Jun. 7, 2023.
Das et al, A Scalable Decoder Micro-architecture for Fault-Tolerant Quantum Computing. arXiv preprint arXiv:2001.06598 (2020).
Delfosse et al, Almost-linear time decoding algorithm for topological codes. Quantum 5 (2021): 595.
Delfosse et al, Toward a Union-Find decoder for quantum LDPC codes. IEEE Transactions on Information Theory 68.5 (2022): 3187-3199.
Fan, et al. Robust Optimization of Graph Partitioning and Critical Node Detection in Analyzing Networks. In Combinatorial Optimization and Applications—4th International Conference, COCOA 2010, Proceedings (Part 1 ed., pp. 170-183). (Year: 2010).
Fan, et al. Robust optimization of graph partitioning involving interval uncertainty. Theoretical Computer Science. 447 (2012): 53-61.
Fowler, A.G. Minimum weight perfect matching in O (1) parallel time. arXiv 1307 (2013).
Gheorghiu, V. Standard form of qudit stabilizer groups. arXiv preprint arXiv:1101.1519 (2011).
Glover et al. Tabu Search. Handbook of Combinatorial Optimization, Du DZ., Pardalos P.M. (eds), Springer, Boston, MA, 1998; 94 pgs.
Gottesman, D. An Introduction to Quantum Error Correction and Fault-Tolerant Quantum Computation. arXiv preprint arXiv:0904.2557 (2009).
Han et al., "Approximate computing: An emerging paradigm for energy-efficient design," 18th IEEE European Test Symposium (ETS), IEEE, 2013; https://ieeexplore.ieee.org/document/6569370.
Hennessy, et al. Computer Architecture: A Quantitative Approach. Elsevier Science & Technology, 2014. ProQuest Ebook Central, https://ebookcentral.proquest.com/lib/uspto-ebooks/detail.action?docID=404052 . (Year: 2014).
Huang et al, Fault-tolerant weighted union-find decoding on the toric code. Physical Review A 102.1 (2020): 012419.
Jiang, et al. Simulated annealing based influence maximization in social networks. Twenty-fifth AAAI conference on artificial intelligence (AAAI'11). AAAI Press, 127-132. (Year: 2011).
Karimi, et al. Practical integer-to-binary mapping for quantum annealers. Quantum Information Processing, vol. 18, No. 4, 94 (2019) DOI: 10.1007/s11128-019-2213-x.
Knill, et al. Resilient Quantum Computation: Error Models and Thresholds. Proceedings of the Royal Society of London. Series A: Mathematical, Physical and Engineering Sciences 454.1969 (1998): 365-384.
Krol et al., "Efficient decomposition of unitary matrices in quantum circuit compilers," 2021, arXiv preprint arXiv:2101.02993, 13 pgs.
Kubica et al, Efficient color code decoders in d=2 dimensions from toric code decoders. arXiv preprint arXiv:1905.07393 (2019).
Mao, et al. Artificial neural networks for feature extraction and multivariate data projection. IEEE Transactions on Neural Networks. vol. 6, No. 2, pp. 296-317, Mar. 1995, doi: 10.1109/72.363467.
Matsubara, et al. Ising-Model Optimizer with Parallel-Trial Bit-Sieve Engine. Complex, Intelligent, and Software Intensive Sys-

(56) References Cited

OTHER PUBLICATIONS tems: Proceedings of the 11th International Conference on Complex, Intelligent, and Software Intensive Systems (CISIS-2017), pp. 432-438, 2018.
McCaskey, et al. Hybrid Programming for Near-term Quantum Computing Systems. 2018 IEEE international conference on rebooting computing (ICRC). 2018. pp. 1-12.
Membrives, E.J. Machine-Learning for Optimization of Software Parameters. Technical Disclosure Commons. Defensive Publication Series. Dec. 7, 2017. pp. 1-35. https://www.tdcommons.org/dpubs_series/898.
Nielsen, et al. Quantum Computation and Quantum Information. Chapter 10: Quantum error-correction. Cambridge University Press. pp. 425-499. (2010).
Parekh, et al. Benchmarking adiabatic quantum optimization for complex network analysis. arXiv preprint arXiv: 1604.00319 (2016). (Year: 2016).
PCT/IB2021/059421 International Search Report and Written Opinion dated Dec. 20, 2021.
PCT/IB2021/061527 International Search Report and Written Opinion dated Apr. 8, 2022.
PCT/IB2022/053658 International Search Report and Written Opinion dated Jun. 27, 2022.
PCT/IB2022/056124 International Search Report and Written Opinion dated Sep. 16, 2022.
PCT/IB2022/059253 International Search Report and Written Opinion dated Jan. 27, 2023.
Pedram, et al. Layout Optimization for Quantum Circuits with Linear Nearest Neighbor Architectures. IEEE Circuits and Systems Magazine 16 (2016): 62-74.
Pedregosa, F. Hyperparameter optimization with approximate gradient. International conference on machine learning. PMLR, 2016.
Pillutla, et al. A Smoother Way to Train Structured Prediction Models. NIPS'18: Proceedings of the 32nd International Conference on Neural Information Processing Systems. Dec. 3, 2018. doi:10.48550/arxiv.1902.03228 Retrieved from the Internet: https://dl.acm.org/doi/pdf/10.5555/3327345.3327386.
Rappe, et al. UFF, a Full Periodic Table Force Field for Molecular Mechanics and Molecular Dynamics Simulations. J. Am. Chem. Soc. 1992, 114, 25, 10024-10035. https://doi.org/10.1021/ja00051a040.
Resende, et al. GRASP with path-relinking: Recent advances and applications. Metaheuristics: progress as real problem solvers (2005): 29-63.
Sakaguchi, et al. Boltzmann Sampling by Degenerate Optical Parametric Oscillator Network for Structure-Based Virtual Screening. Entropy. 2016; 18(10):365. https://doi.org/10.3390/e18100365.
Sefi, et al. How to decompose arbitrary continuous-variable quantum operations. Physical review letters 107.17 (2011): 170501.
Sepehry, et al. Smooth Structured Prediction Using Quantum and Classical Gibbs Samplers. Oct. 1, 2018 (Oct. 1, 2018) Retrieved from the Internet: URL: https://arxiv.org/pdf/1809.04091v2.pdf [retrieved on Sep. 5, 2022].
U.S. Appl. No. 15/900,643 Office Action dated Apr. 14, 2022.
U.S. Appl. No. 16/671,767 Office Action dated Aug. 30, 2022.
U.S. Appl. No. 16/811,479 Office Action dated Apr. 8, 2022.
U.S. Appl. No. 16/811,479 Office Action dated Feb. 14, 2023.
U.S. Appl. No. 16/811,479 Office Action dated Sep. 22, 2022.
U.S. Appl. No. 16/888,419 Office Action dated Feb. 3, 2023.
U.S. Appl. No. 17/110,729 Office Action dated May 9, 2023.
U.S. Appl. No. 17/254,661 Office Action dated Mar. 18, 2022.
U.S. Appl. No. 17/254,661 Office Action dated Mar. 22, 2023.
U.S. Appl. No. 17/254,661 Office Action dated Sep. 14, 2022.
U.S. Appl. No. 18/047,882 Office Action dated Jul. 3, 2023.
U.S. Appl. No. 18/047,981 Office Action dated Jan. 11, 2023.
Ushijima-Mwesigwa, et al. Graph Partitioning using Quantum Annealing on the D-Wave System. Proceedings of the Second International Workshop on Post Moores Era Supercomputing. 2017. (Year: 2017).
Wah, et al. Simulated Annealing with Asymptotic Convergence for Nonlinear Constrained Global Optimization. Principles and Practice of Constraint Programming—CP'99: 5th International Conference, CP'99, Alexandria, VA, USA, Oct. 11-14, 1999. Proceedings 5. Springer Berlin Heidelberg, 1999.
Wikipedia. Automatic Differentiation. Article from Nov. 23, 2016. https://en.wikipedia.org/w/index.php?title=Automatic_differentiation&oldid=751071969. Accessed Jan. 29, 2023. (Year: 2016).
Yanagimoto, et al. Engineering a Kerr-based Deterministic Cubic Phase Gate via Gaussian Operations. Physical Review Letters 124.24 (2020): 240503.
Zhu, et al. Training of quantum circuits on a hybrid quantum computer. Sci Adv. Oct. 2019; 5(10): eaaw9918. Published online Oct. 18, 2019. doi: 10.1126/sciadv.aaw9918.

\* cited by examiner

METHOD AND SYSTEM FOR MAPPING A DATASET FROM A HILBERT SPACE OF A GIVEN DIMENSION TO A HILBERT SPACE OF A DIFFERENT DIMENSION

CROSS-REFERENCE TO RELATED APPLICATIONS

This application is a National Stage application of International Application No. PCT/IB2020/055801, filed Jun. 19, 2020, which claims priority from U.S. Provisional patent application No. 62/863,510 entitled "Method and system for mapping a dataset from a Hilbert space of a given dimension to a Hilbert space of a different application" and of U.S. Provisional patent application No. 62/925,488 entitled "Method and system for mapping a dataset from a Hilbert space of a given dimension to a Hilbert space of a different application", which are incorporated by reference herein in their entireties.

FIELD

One or more embodiments of the invention relate to machine learning and feature engineering. More precisely, one or more embodiments of the invention pertain to a method and system for mapping a dataset from a Hilbert space of a given dimension to a Hilbert space of a different dimension.

BACKGROUND

It will be appreciated that being able to use linear separators such as a line in a two-dimensional space or a hyperplane in higher-dimensional Hilbert space is of great interest in the field of machine learning, deep learning and pattern recognition for separating data samples in a dataset with respect to one another. As shown in FIG. 1, a first dataset D1 in a first given dimension comprises a first sub-dataset 100 and a second sub-dataset 102. It will be appreciated that it is not possible to separate the first sub-dataset 100 and the second sub-dataset 102 using a line. As shown in FIG. 1, a curve 108 may be used for separating the first sub-dataset 100 from the second sub-dataset 102.

A solution for overcoming this issue is to transform each data sample of the dataset D1 to another data sample using an explicit mapping from the space of D1 to another space having a dimension higher than the dimension of the original space of D1 as shown in FIG. 1. In the embodiment disclosed in FIG. 1, the dimension of the original space is two while the dimension of the other space is three. It will be appreciated that the first sub-dataset 100 has been mapped into a corresponding sub-dataset 104 in the other space, while the second sub-dataset 102 has been mapped into the second sub-dataset 106 in the other space. As shown in FIG. 1, the first sub-dataset 104 and the second sub-dataset 106 of the other space can be separated using a linear separator which is plane 110, which can be of great advantage for specific applications. It will be appreciated that there are two ways to handle the needs of transforming the feature space of the given datasets from the one shown in FIG. 1 to the left to the one shown in FIG. 1 on the right.

A first method is to explicitly transform each data sample into a corresponding one in the new feature space via a user-specified feature map.

A second method is to use a kernel, i.e. a similarity function over pairs of data in raw representation. Kernel functions enable classifiers to operate in a high-dimensional, implicit feature space without ever computing the coordinates of the data in that space, but rather by simply computing the inner products between the images of all pairs of data in the feature space. The operation is often computationally cheaper than the explicit computation of the coordinates, and is referred to as a "kernel trick." While it is comparatively cheaper to employ than calculating the explicit feature map, the method can become resource-intensive because it requires $n^2$ computations wherein n is the number of data samples of the dataset. It will therefore be appreciated by the skilled addressee that, for datasets with millions of data samples, employing such methods becomes a computational bottleneck.

There is a need for at least one of a method and a system for mapping the datasets from a Hilbert space of a given dimension to a Hilbert space of a different dimension which will overcome the above-mentioned drawback.

Features of the invention will be apparent from review of the disclosure, drawings and description of the invention below.

BRIEF SUMMARY

According to a broad aspect, there is disclosed a computer-implemented method for mapping a dataset from a Hilbert space of a given dimension to a Hilbert space of a different dimension, the method comprising obtaining a dataset D comprising n data samples $x_i$, $x_i \in \mathbb{R}^p$ for $i \in \{1, 2, \ldots, n\}$, wherein p is the dimension of each data sample; for each data sample $x_i$ of the dataset D, for a plurality of episodes e, generating an encoded sample $J_i = Ax_1 + b$, wherein A is a q×p matrix comprising elements drawn from a first distribution, q is indicative of a number of qubits available in an adiabatic quantum device and b is a q-dimensional vector comprising elements drawn from a second distribution; configuring the adiabatic quantum device by embedding each encoded sample into a q-body Ising Hamiltonian H representative of the adiabatic quantum device and defined by:

$$H(t)^e_{x_i} = a(t)H_i + b(t)H_f$$

wherein a(t) and b(t) are classical external fields driving the Hamiltonian H(t) over the time span [0,T], and $H_i$ is the initial Hamiltonian and $H_f$ is the final or encoding Hamiltonian defined by:

$$H_i = \sum_v^q \sigma_v^x, \quad H_f = \sum_u^q j_u^e \sigma_u^z + \sum_{l,m} h_{l,m} \sigma_m^z \sigma_l^z$$

wherein $\sigma^x$, $\sigma^z$ are Pauli-X and Pauli-Z operators, respectively, and $h_{l,m}$ is a parameter which may be defined as a function that depends on the encoded sample values $j_u^e$, causing the adiabatic quantum device to evolve from an initial state at $t_i=0$ to a final state at $t_f=t$ wherein $t \leq T$; and performing a projective measurement along a z axis at the final state to determine a value of each qubit of the adiabatic quantum device; generating a corresponding binary vector representative of the given data sample $x_i$ in a transformed Hilbert space using the determined value of each qubit at each episode e; wherein each generated binary vector corresponds to a mapped data sample; and providing a mapped dataset comprising each of the generated corresponding binary vectors.

In accordance with one or more embodiments, the first distribution comprises a parametrized probability distribution and the elements of the matrix A are drawn from the first distribution using one of a digital computer and a quantum computer.

In accordance with one or more embodiments, the elements of the matrix A are drawn from the first distribution using the adiabatic quantum device, further wherein the parameters of the first distribution are the parameters of the Hamiltonian representative of the adiabatic quantum device.

In accordance with one or more embodiments, the elements of the matrix A are drawn from the first distribution using a gate-model quantum computer, further wherein the parameters of the first distribution are the parameters of quantum logic gates.

In accordance with one or more embodiments, the parameters of the first distribution are adaptive variables.

In accordance with one or more embodiments, the obtaining of the dataset comprises at least one of receiving the dataset from a user interacting with a digital computer, obtaining the dataset from a memory unit located in a digital computer and obtaining the dataset from a remote processing device operatively connected with a digital computer.

In accordance with one or more embodiments, the configuring of the adiabatic quantum device further comprises: computing a $q_2$-body Ising Hamiltonian for $q_2$ qubits of the adiabatic quantum device, the $q_2$-body Ising Hamiltonian comprising a randomness factor; generating a global Hamiltonian comprising the q-body Ising Hamiltonian, the computed $q_2$-body Ising Hamiltonian and interacting terms between the $q_2$-body Ising Hamiltonian and the q-body Ising Hamiltonian H; wherein the configuration of the adiabatic quantum device is performed using the global Hamiltonian.

In accordance with one or more embodiments, the configuring of the adiabatic quantum device further comprises: computing a $q_3$-body Ising Hamiltonian for $q_3$ qubits of the adiabatic quantum device, the $q_3$-body Ising Hamiltonian comprising at least two adaptive variables and adding the $q_3$-body Ising Hamiltonian and interaction terms between the $q_3$-body Ising Hamiltonian and the $q_2$-body Ising Hamiltonian and the q-body Ising Hamiltonian H to the global Hamiltonian; wherein the at least two adaptive variables are updated based on a performance obtained using a machine learning algorithm applied on the generated mapped dataset.

In accordance with one or more embodiments, the $q_2$-body Ising Hamiltonian is defined by $H_r^e = \Sigma_g^{q_2} \tilde{J}_g \sigma_g^z + \Sigma_{<k,w>} \tilde{h}_{k,w} \sigma_k^z \sigma_w^z$, wherein r is a randomness factor, $\tilde{J}_g$ and $\tilde{h}_{k,w}$ are real numbers and $<k,w>$ goes over pair-wise interacting qubits.

In accordance with one or more embodiments, the $\tilde{J}_g$ and $\tilde{h}_{k,w}$ are drawn randomly from a classical probability distribution.

In accordance with one or more embodiments, the $\tilde{J}_g$ and $\tilde{h}_{k,w}$ are drawn randomly from $\{0,1,-1\}$.

In accordance with one or more embodiments, the $q_3$-body Ising Hamiltonian is defined by $H_a^e = \Sigma_i \alpha_i \sigma_i^z + \Sigma_{<j,k>} \beta_{j,k} \sigma_j^z \sigma_k^z$, wherein $\alpha$ and $\beta$ are the adaptive variables and $<j, k>$ goes over pair-wise interacting qubits.

In accordance with one or more embodiments, $h_{l,m}$ is equal to an absolute mean of the $j_u^e$ values.

In accordance with one or more embodiments, a dropout technique is used for adaptive variables of the method.

According to a broad aspect, there is disclosed a digital computer comprising a central processing unit; a display device; a communication port for operatively connecting the digital computer to an adiabatic quantum device; a memory unit comprising an application for mapping a dataset from a Hilbert space of a given dimension to a Hilbert space of a different dimension, the application comprising instructions for obtaining a dataset D comprising n data samples $x_i$, $x_i \in \mathbb{R}^p$ for $i \in \{1,2,\ldots,n\}$, wherein p is the dimension of each data sample; instructions for, for each data sample $x_i$ of the dataset D, instructions for, for a plurality of episodes e, generating an encoded sample $J_i = Ax_i + b$, wherein A is a q×p matrix comprising elements drawn from a first distribution, q is indicative of a number of qubits available in an adiabatic quantum device and b is a q-dimensional vector comprising elements drawn from a second distribution; configuring the adiabatic quantum device by embedding each encoded sample into a q-body Hamiltonian H(t) representative of an adiabatic quantum device and defined by: $H(t)_{x_i}^e = a(t)H_i + b(t)H_f$ wherein a(t) and b(t) are classical external fields driving the Hamiltonian H(t) over the time span [0,T], and $H_i$ is the initial Hamiltonian and $H_f$ is the final or encoding Hamiltonian defined as follow $H_i = \Sigma_v^q \sigma_v^x$, $H_f = \Sigma_u^q j_u^e \sigma_u^z + \Sigma_{l,m} h_{l,m} \sigma_m^z \sigma_l^z$ wherein $\sigma^x$, $\sigma^z$ are Pauli-X and Pauli-Z operators, respectively, and $h_{l,m}$ is a parameter which is defined as a function that depends on the encoded sample values $j_u^e$, causing the adiabatic quantum device to evolve from an initial state at $t_i = 0$ to a final state at $t_f = t$ wherein $t \leq T$; and performing a projective measurement along a z axis at the final state to determine a value of each qubit of the adiabatic quantum device; instructions for generating a corresponding binary vector representative of the given data sample $x_i$ in a transformed Hilbert space using the determined value of each qubit at each episode e; wherein each generating binary vector corresponds to a mapping of a corresponding data sample; and instructions for providing a mapped dataset comprising each of the generated corresponding binary vectors.

According to a broad aspect, there is disclosed a non-transitory computer readable storage medium for storing computer-executable instructions which, when executed, cause a digital computer to perform a method for mapping a dataset from a Hilbert space of a given dimension to a Hilbert space of a different dimension, the method comprising obtaining a dataset D comprising n data samples $x_i$, $x_i \in \mathbb{R}^p$ for $i \in \{1,2,\ldots,n\}$, wherein p is the dimension of each data sample; for each data sample $x_i$ of the dataset D, for a plurality of episodes e, generating an encoded sample $J_i = Ax_i + b$, wherein A is a q×p matrix comprising elements drawn from a first distribution, q is indicative of a number of qubits available in an adiabatic quantum device and b is a q-dimensional vector comprising elements drawn from a second distribution; configuring the adiabatic quantum device by embedding each encoded sample into a q-body Hamiltonian H(t) representative of an adiabatic quantum device and defined by: $H(t)_{x_i}^e = a(t)H_i + b(t)H_f$ wherein a(t) and b(t) are classical external fields driving the Hamiltonian H(t) over the time span [0,T], and $H_i$ is the initial Hamiltonian and $H_f$ is the final or encoding Hamiltonian defined by: $H_i = \Sigma_v^q \sigma_v^x$, $H_f = \Sigma_u^q j_u^e \sigma_u^z + \Sigma_{l,m} h_{l,m} \sigma_m^z \sigma_l^z$ wherein $\sigma^x x$, $\sigma^z$ are Pauli-X and Pauli-Z operators, respectively, and $h_{l,m}$ is a parameter which is defined as a function that depends on the encoded sample values $j_u^e$, causing the adiabatic quantum device to evolve from an initial state at $t_i = 0$ to a final state at $t_f = t$ wherein $t \leq T$; and performing a projective measurement along a z axis at the final state to determine a value of each qubit of the adiabatic quantum device; generating a corresponding binary vector representative of the given data sample $x_i$ in a transformed Hilbert space using the determined value of each qubit at each episode e; wherein each generating binary vector corresponds to a mapping of a corresponding data sample; and providing a mapped dataset comprising each of the generated corresponding binary vectors.

According to a broad aspect, there is disclosed a method for training a machine learning model using an adiabatic quantum device, the method comprising obtaining a dataset D used for training a machine learning model; obtaining a machine learning model to train; mapping the obtained dataset D from a Hilbert space of a given dimension to a Hilbert space of a different dimension comprising a quantum feature space using the method disclosed above; training the obtained machine learning model using the mapped dataset.

According to a broad aspect, there is disclosed a method for performing a machine learning task, the method comprising providing a machine learning model trained according to the method disclosed above; and using the machine learning model trained for performing the machine learning task.

An advantage of one or more embodiments of the method for mapping a dataset from a Hilbert space of a given dimension to a Hilbert space of a different dimension disclosed herein is that they transform the dataset such that using the transformed dataset, a machine learning practitioner is able to perform the needed machine learning operation using much less complex machine learning model. Using less complex machine learning model translates to faster training and execution. Less complex machine learning models are less prone to overfitting, which is a significant challenge when using machine learning models for practical datasets.

Another advantage of one or more embodiments of the method for mapping a dataset from a Hilbert space of a given dimension to a Hilbert space of a different dimension disclosed herein is that the privilege of using simpler machine learning models enables the use of linear machine learning models. Linear models are transparent and allow the practitioner to decipher mathematical relationship between the output and the input. This is of utmost requirement in practical applications like finance and health. Complex machine learning models do not provide this capability.

Another advantage of one or more embodiments of the method for mapping a dataset from a Hilbert space of a given dimension to a Hilbert space of a different dimension disclosed is that they use quantum correlation, such as quantum entanglement or quantum superposition, to map data from one space to another.

Another advantage of one or more embodiments of the method for mapping a dataset from a Hilbert space of a given dimension to a Hilbert space of a different dimension disclosed is that various types of distributions may be used for encoding data points into the quantum Hamiltonian, so that the learning performance may be enhanced.

Another advantage of one or more embodiments of the method for mapping a dataset from a Hilbert space of a given dimension to a Hilbert space of a different dimension disclosed is that they may also be used as an explicit kernel when one gets the inner product of the transformed data points, so kernel based machine learning algorithms may be used as well.

BRIEF DESCRIPTION OF THE DRAWINGS

In order that the invention may be readily understood, embodiments of the invention are illustrated by way of example in the accompanying drawings.

DETAILED DESCRIPTION

Figure 1:
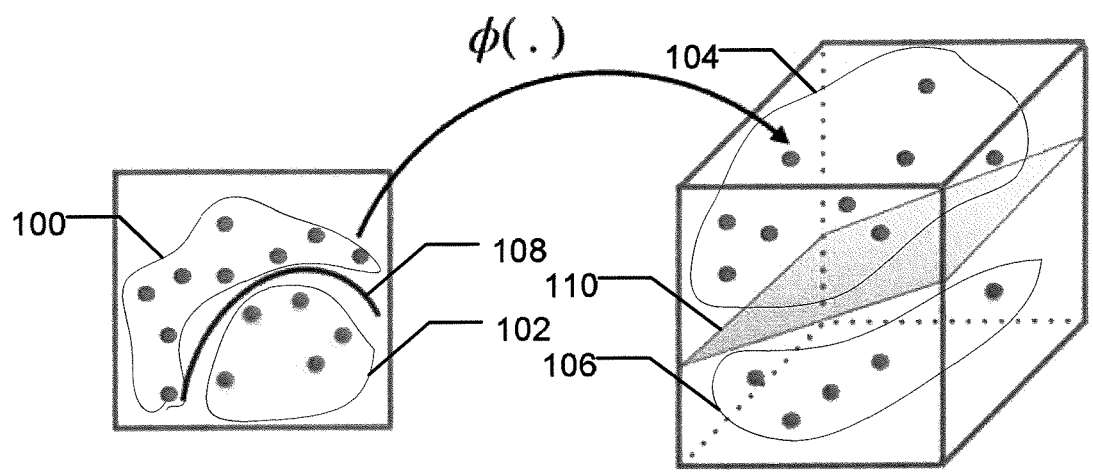
FIG. 1 is a diagram which illustrates a mapping of a dataset from a Hilbert space of a first dimension to another Hilbert space of a second dimension.

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limit the terms or phrases they explain.

The term "adiabatic quantum device" refers to a quantum computer that works based on the idea of adiabatic evolution of the physical system. In particular the adiabatic term refers to the speed of the evolution of the quantum system that evolves slowly with respect to the gap between the ground state energy and first excited state energy of the system.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that one or more embodiments of the disclosed invention(s) may be practiced with various modifications and alterations, such as structural and logical modifications. Although particular features of the one or more embodiments of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, one or more embodiments of the present invention are directed to a computer-implemented method for mapping a dataset from a Hilbert space of a given dimension to a Hilbert space of a different dimension, a system for mapping a dataset from a Hilbert space of a given dimension to a Hilbert space of a different dimension and a use of the method for mapping a dataset from a Hilbert space of a given dimension to a Hilbert space of a different dimension.

Figure 3:
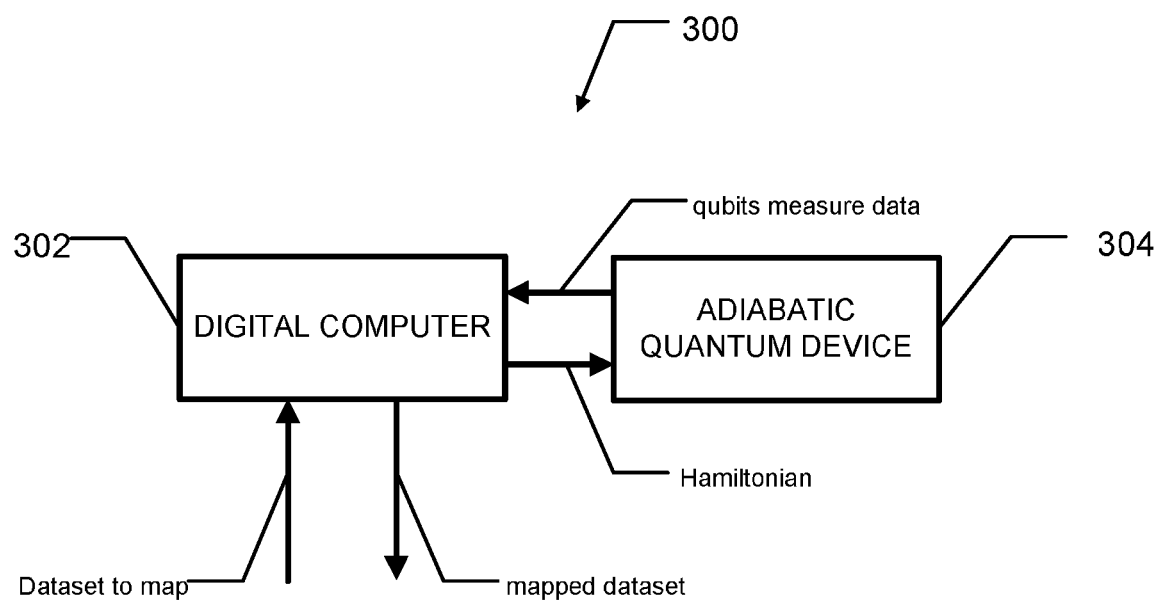
FIG. 3 is a diagram of a system used for implementing the method for mapping a dataset from a Hilbert space of a given dimension to a Hilbert space of a different dimension using an adiabatic quantum device. The system comprises a digital computer operatively connected to an adiabatic quantum device.

Now referring to FIG. 3, there is shown an embodiment of a system which may be used for mapping a dataset from a Hilbert space of a given dimension to a Hilbert space of a different dimension.

The system 300 comprises a digital computer 302 and an adiabatic quantum device 304. It will be appreciated that the digital computer 302 is operatively connected with the adiabatic quantum device 304.

Moreover, it will be appreciated that the digital computer 302 receives a dataset to map and provides a mapped dataset. The digital computer 302 further provides a Hamiltonian to configure the adiabatic quantum device 304. The digital computer 302 further receives qubits measurements data from the adiabatic quantum device 304.

It will be appreciated that the digital computer 302 may be of various types. In one embodiment, the digital computer 302 is selected from a group consisting of desktop computers, laptop computers, tablet PC's, servers, smartphones, etc. It will also be appreciated that, in the foregoing, the digital computer 302 may also be broadly referred to as a processor.

Figure 4:
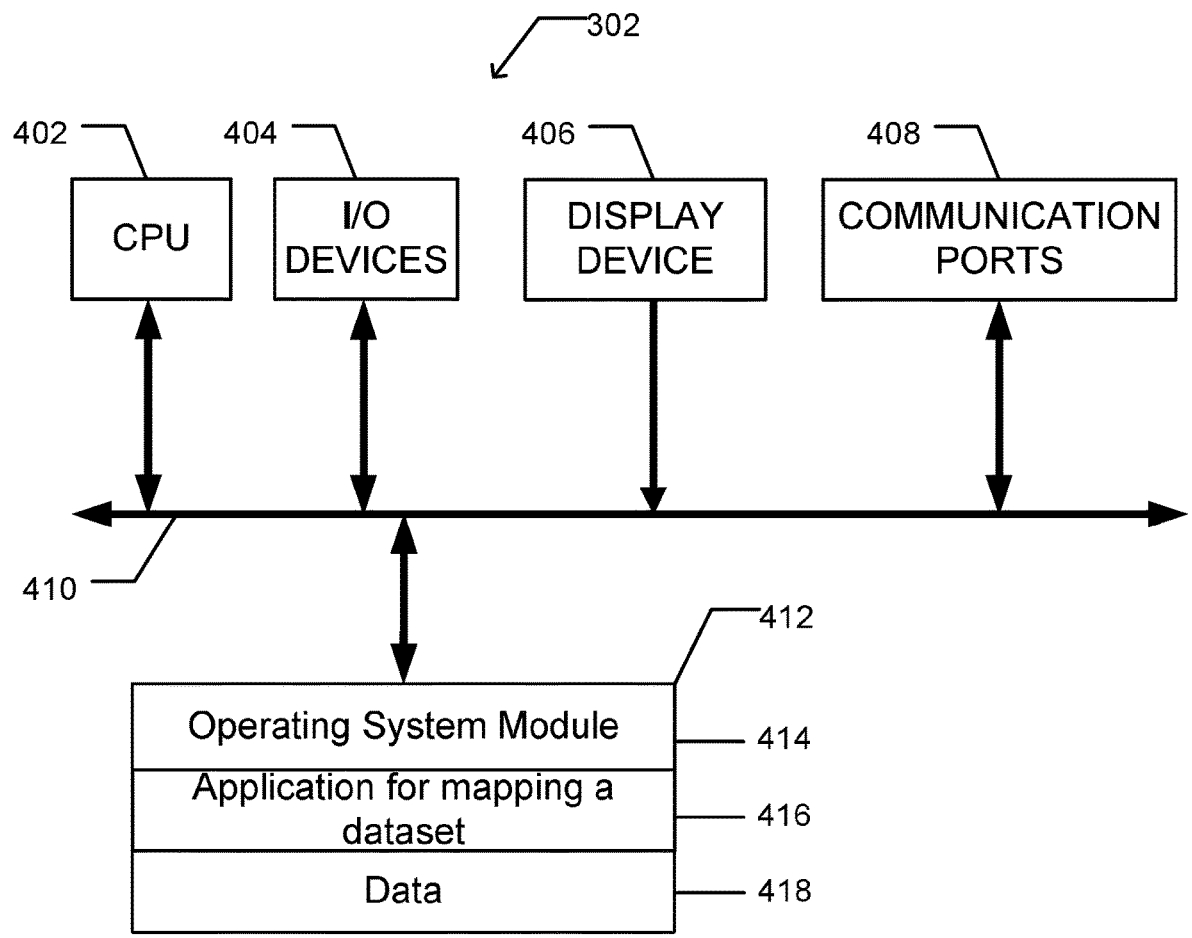
FIG. 4 is a block diagram which shows an embodiment of the digital computer used in the system used for implementing the method for mapping a dataset from a Hilbert space of a given dimension to a Hilbert space of a different dimension using an adiabatic quantum device.

More precisely and now referring to FIG. 4, there is shown an embodiment of a digital computer 302 which may be used in a system for mapping a dataset from a Hilbert space of a given dimension to a Hilbert space of a different dimension.

In the embodiment shown in FIG. 4, the digital computer 302 comprises a central processing unit 402, also referred to as a microprocessor, input/output devices 404, a display device 406, communication ports 408, a data bus 410 and a memory unit 412.

The central processing unit 402 is used for processing computer instructions. The skilled addressee will appreciate that various embodiments of the central processing unit 402 may be provided.

In one embodiment, the central processing unit 402 comprises a CPU Core i5 3210 running at 2.5 GHz and manufactured by Intel™.

The input/output devices 404 are used for inputting/outputting data into the digital computer 302.

The display device 406 is used for displaying data to a user. The skilled addressee will appreciate that various types of display device 406 may be used.

In one embodiment, the display device 406 is a standard liquid crystal display (LCD) monitor.

The communication ports 408 are used for operatively connecting the digital computer to the adiabatic quantum device 304 and to an optional remote processing device, not shown.

The communication ports 408 may comprise, for instance, universal serial bus (USB) ports for connecting a keyboard and a mouse to the digital computer 302.

The communication ports 408 may further comprise a data network communication port, such as an IEEE 802.3 port, for enabling a connection of the digital computer 302 with the adiabatic quantum device 304.

The skilled addressee will appreciate that various alternative embodiments of the communication ports 408 may be provided.

The memory unit 412 is used for storing computer-executable instructions.

The memory unit 412 may comprise a system memory such as a high-speed random access memory (RAM) for storing system control program (e.g., BIOS, operating system module, applications, etc.) and a read-only memory (ROM).

It will be appreciated that the memory unit 412 comprises, in one embodiment, an operating system module 414.

It will be appreciated that the operating system module 414 may be of various types.

In one embodiment, the operating system module 414 is OS X Yosemite manufactured by Apple™.

The memory unit 412 further comprises an application for mapping a dataset from a Hilbert space of a given dimension to a Hilbert space of a different dimension 416.

The memory unit 412 is further used for storing data 418.

Figure 2:
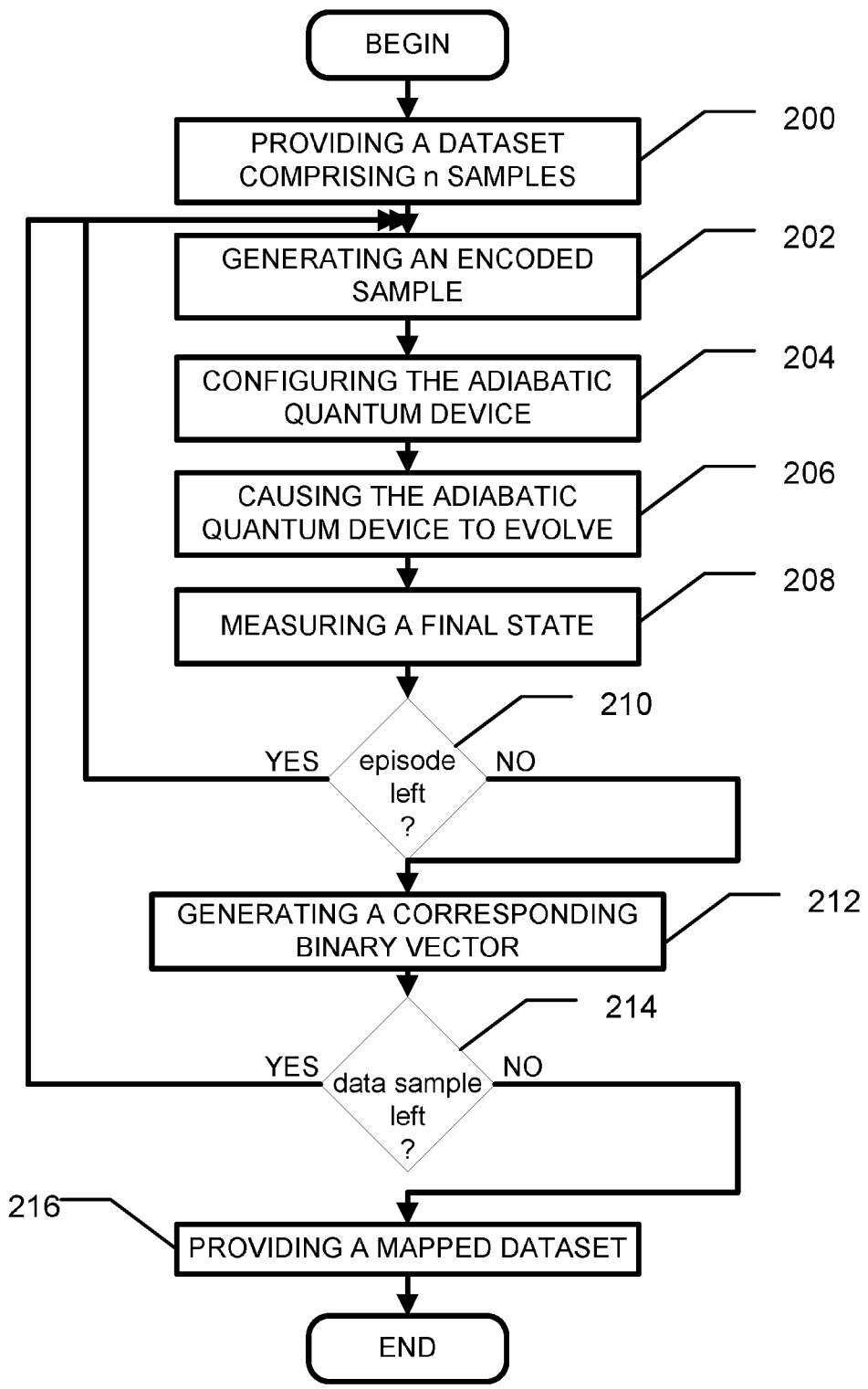
FIG. 2 is a flowchart which shows an embodiment of a method for mapping a dataset from a Hilbert space of a given dimension to a Hilbert space of a different dimension using an adiabatic quantum device.

Now referring to FIG. 2, there is shown an embodiment of the method for mapping a dataset from a Hilbert space of a given dimension to a Hilbert space of a different dimension.

According to processing step 200, a dataset D comprising n data samples is provided. It will be appreciated that the dataset D comprises n data samples $x_i$, $x_i \in \mathbb{R}^p$ for $i \in \{1, 2, \ldots, n\}$ in a Hilbert space having a given dimension p.

The skilled addressee will appreciate that in one non-limitative embodiment, the n data samples are for instance x-ray images that need to be separated into healthy and unhealthy sets.

It will be appreciated that the dataset comprises the n data samples may be provided according to various embodiments. In fact, it will be appreciated that the obtaining of the dataset comprising the n data samples comprises at least one of receiving the dataset comprising the n data samples from a user interacting with a digital computer, obtaining the dataset comprising the n data samples from a memory unit located on the digital computer and obtaining the dataset comprising the n data samples from a remote processing device operatively connected with the digital computer. It will be appreciated that the remote processing device may be of various types, as known to the skilled addressee. It will be further appreciated that the remote processing device may be operatively connected with the digital computer according to various embodiments. In one embodiment, the remote processing device is operatively connected with the digital computer via a data network. It will be appreciated that the data network may be selected from a group comprising at least one of a local area network (LAN), a metropolitan area network (MAN) and a wide area network (WAN). In one embodiment, the data network comprises the Internet.

According to processing step 202, an encoded sample is generated. It will be appreciated that the encoded sample may be generated according to various embodiments.

In one embodiment, the encoded sample is generated by the digital computer. In another embodiment, the encoded sample is generated by a remote processing device operatively connected with the digital computer.

In one embodiment, the encoded sample of a data sample $x_i$ is defined by $J_i = Ax_i + b$, wherein A is a q×p matrix comprising elements drawn from a first distribution. It will be appreciated that the first distribution may be of various types. In fact, it will be appreciated that the first distribution may be any parametrized probability distribution. In one embodiment, the first probability distribution is a normal distribution $N(\mu, \sigma^2)$. In another embodiment, the first distribution is an exponential distribution $\exp(\lambda)$. It will be appreciated that the elements of the matrix A may be drawn from the first distribution using one of a digital computer and quantum computer. It will also be appreciated that in one or more embodiments, the parameters of the first distribution are adaptive variables.

In the embodiment wherein the quantum computer is used for sampling, the first probability distribution is a quantum probability distribution generated by either a gate-model or an adiabatic quantum device.

It will be appreciated that q is indicative of a number of qubits available in a quantum device. If the adiabatic quantum device is used to sample from the first distribution, a quantum system with q number of qubits is represented via the k-local quantum Hamiltonian $H_p(\theta) = \Sigma_i^w \theta_i H_i$. In this embodiment, the parameters $\theta \in \mathbb{R}^w$ may be considered as adaptive parameters of the learning model. Herein, $H_{in}$ is considered as the initial quantum Hamiltonian (with a known ground state) so that the total time-dependent Hamiltonian of the quantum system is $H(t) = b(t) H_{in} + a(t) H_p$. a(t) and b(t) are smooth time-dependent functions which are monotonically decreasing and increasing functions over the time span $[0, t_f]$, respectively. To generate each element of the matrix A, after the end of adiabatic quantum evolution, a measurement in Z-basis is performed on a subset of qubits of the quantum system. The measurement output denoted by $|0\rangle$ is used to calculate $\mathrm{tr}(|0\rangle\langle 0|B)$ for an observable operator B. The result is used as one of the elements of the matrix A. The observable operator B may be any Hermitian matrix. In one embodiment, the observable is the tensor product of Pauli-Z operators. In an alternative embodiment, the binary output of the measurement may be used directly as an element of the matrix A. It will be therefore appreciated that in such embodiment, the parameters of the first distribution are the parameters of the Hamiltonian $H_p(\theta)$ representative of the adiabatic quantum device.

In one embodiment wherein a gate-model quantum computer is used to construct the matrix A, the parameters of the first distribution are the parameters of the quantum logic gates. More precisely, it will be appreciated that a parameterized unitary operator $U(\theta)$ acts on q number of qubits. In this embodiment, the parameters $\theta \in \mathbb{R}^w$ may be considered as adaptive parameters of the learning model. The unitary operator $U(\theta)$ evolves the initial state of the quantum system toward a final state. To generate each element of the matrix A, after the end of the evolution, a measurement in Z-basis is performed on a subset of qubits of the quantum system. The measurement output denoted by $|0\rangle$ is used to calculate $\mathrm{tr}(|0\rangle\langle 0|B)$ for an observable operator B. The result is used as one of the elements of the matrix A. The observable operator B may be any Hermitian matrix.

It will be appreciated that q is indicative of a number of qubits available in an adiabatic quantum device and b is a q dimensional vector comprising elements drawn from a second distribution. It will be appreciated that the second distribution may be of various types.

In one embodiment, the second distribution is a uniform distribution from $[-1, 1]$. In another embodiment, the second distribution is any well-defined probability distribution function. In another embodiment, the second distribution is replaced by a constant value.

Still referring to FIG. 2 and according to processing step 204, the adiabatic quantum device is configured. It will be appreciated that the adiabatic quantum device may be configured according to various embodiments.

Figure 5:
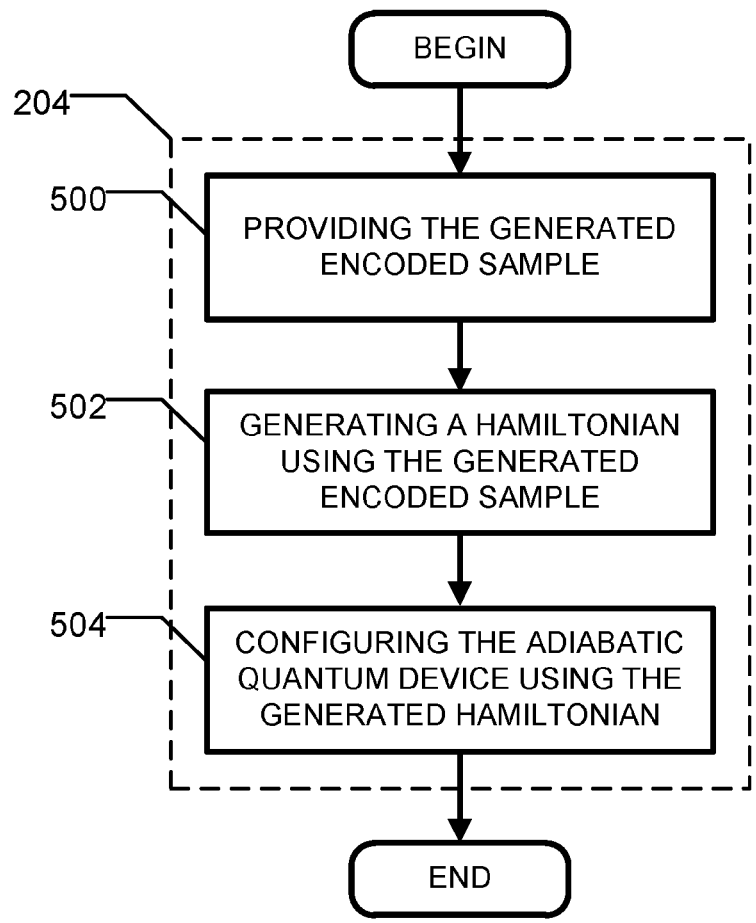
FIG. 5 is a flowchart which shows a first embodiment for configuring the adiabatic quantum device used in the method for mapping a dataset from a Hilbert space of a given dimension to a Hilbert space of a different dimension.

Now referring to FIG. 5, there is shown a first embodiment for configuring the adiabatic quantum device.

According to processing step 500, the generated encoded sample is provided.

It will be appreciated that the generated encoded sample is provided using the digital computer.

According to processing step 502, a Hamiltonian is generated using the generated encoded sample.

It will be appreciated that the Hamiltonian may be generated according to various embodiments. In one embodiment, the Hamiltonian is generated by the digital computer. In another embodiment, the Hamiltonian is generated by a remote processing device operatively connected with the digital computer.

It will be appreciated that the Hamiltonian is generated by advantageously embedding an encoded sample into a q-body Hamiltonian $H(t)_{x_i}^e$ representative of an adiabatic quantum device and defined by:

$$H(t)_{x_i}^e = a(t)H_i + b(t)H_f$$

wherein a(t) and b(t) are classical external fields driving the Hamiltonian H(t) over the time span [0, T], $H_i$ is the initial Hamiltonian and $H_f$ is the final or encoding Hamiltonian defined by:

$$H_i = \sum_v^q \sigma_v^x, H_f = \sum_u^q j_u^e \sigma_u^z + \sum_{<l,m>} h_{l,m} \sigma_m^z \sigma_l^z$$

wherein $\sigma^x$, $\sigma^z$ are Pauli-X and Pauli-Z operators, respectively, and $h_{l,m}$ is a parameter which is defined as a function that depends on the encoded sample values $j_u^e$. For instance and in one embodiment $h_{l,m}$ is determined by computing an absolute mean of the $j_u^e$ values. It will be appreciated that <l,m> goes over pair-wise interacting qubits meaning that those qubits that are directly interacting with each other.

In another embodiment $h_{l,m}$ may be any mathematical function which is independent of the encoded sample values $j_u^e$. One example of such function is a constant function $h_{l,m}=1$.

Still referring to the processing step 502, it will be appreciated that $H_i$ may be any quantum Hamiltonian for which the ground state is known.

Still referring to the processing step 502, it will be appreciated that there is more than one definitive way to construct the encoding Hamiltonian.

Still referring to the processing step 502, it will be appreciated that various types of Hamiltonian may be used as encoding Hamiltonian, For instance in one embodiment a Hamiltonian with three-degree interaction $\sigma^x\sigma^y\sigma^z$ wherein $\sigma^y$ is the Pauli-Y operation.

According to processing step 504, the adiabatic quantum device is configured using the generated Hamiltonian.

It will be appreciated that this processing step is performed by configuring accordingly the adiabatic quantum device using the Hamiltonian generated.

Figure 6:
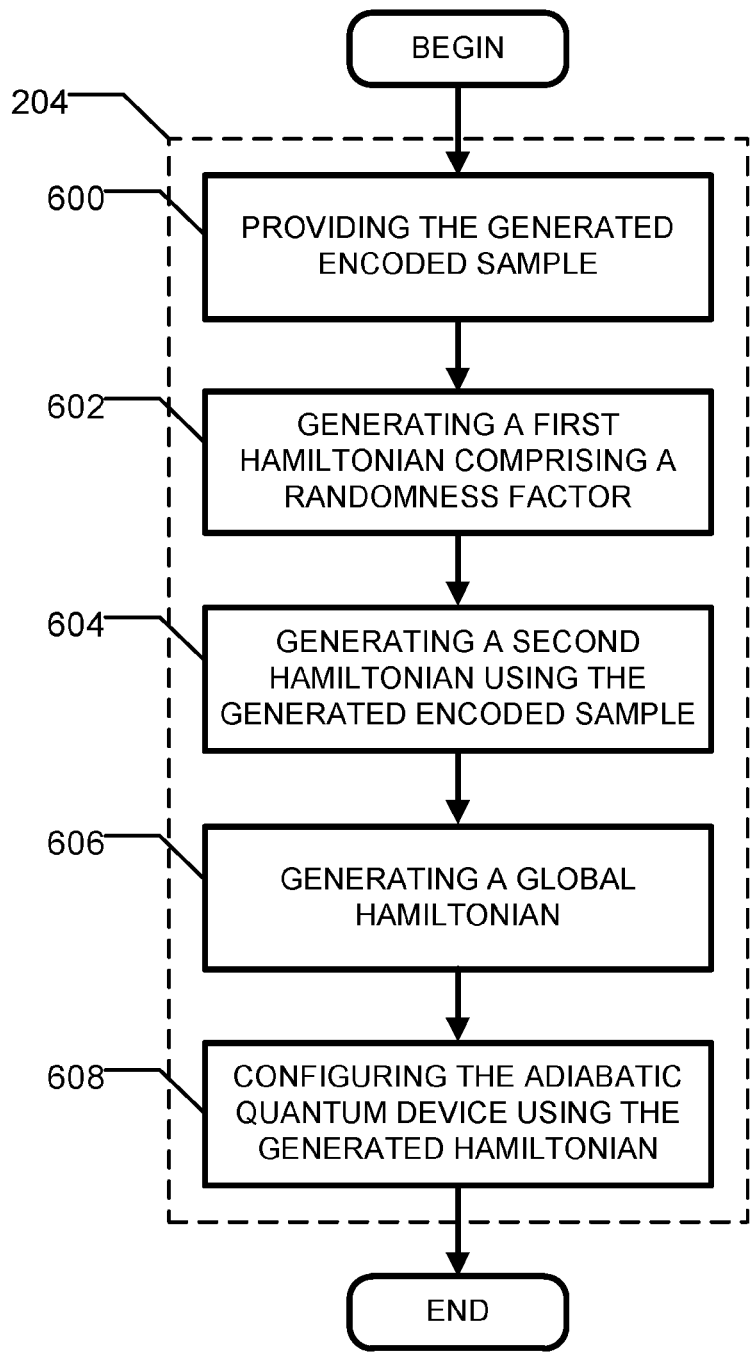
FIG. 6 is a flowchart which shows a second embodiment for configuring the adiabatic quantum device used in the method for mapping a dataset from a Hilbert space of a given dimension to a Hilbert space of a different dimension.

Now referring to FIG. 6, there is shown a second embodiment for configuring the adiabatic quantum device.

According to processing step 600, the generated encoded sample is provided.

It will be appreciated that the generated encoded sample is provided using the digital computer.

According to processing step 602, a first Hamiltonian comprising a randomness factor is generated.

It will be appreciated that the first Hamiltonian may be generated according to various embodiments. In one embodiment, the first Hamiltonian is generated by the digital computer. In another embodiment, the first Hamiltonian is generated by a remote processing device operatively connected with the digital computer.

It will be appreciated that the first Hamiltonian is a $q_2$-body Ising Hamiltonian $H_r^e$ defined by:

$$H_r^e = \sum_g^{q_2} \overline{J}_g \sigma_g^z + \sum_{<k,w>} \overline{h}_{k,w} \sigma_k^z \sigma_w^z$$

wherein r refers to a randomness of the circuit and $\overline{J}_g$ and $\overline{h}_{k,w}$ are real or integer value numbers drawn randomly from a classical probability distribution. For instance and in accordance with an embodiment, $\overline{J}_g$ and $\overline{h}_{k,w}$ are numbers drawn from the set {0,1,−1}. It will be appreciated that <k,w> goes over pair-wise interacting qubits meaning that those qubits that are directly interacting with each other.

It will be appreciated by the skilled addressee that the first Hamiltonian does not depend on the data sample and only represents a randomness of the corresponding adiabatic quantum device.

It will be appreciated by the skilled addressee that there is more than one definitive way to construct the Hamiltonian with random coupling. For instance, in one embodiment, Heisenberg Hamiltonian may be used as part of the circuit with randomness.

Still referring to FIG. 6 and according to processing step 604, a second Hamiltonian is generated using the generated encoded sample.

It will be appreciated that the second Hamiltonian may be generated according to various embodiments. In one embodiment, the second Hamiltonian is generated by the digital computer. In another embodiment, the second Hamiltonian is generated by a remote processing device operatively connected with the digital computer.

It will be appreciated that the second Hamiltonian is generated by advantageously embedding an encoded sample into a $q_1$-body Hamiltonian H representative of an adiabatic quantum device and defined by:

$$H_{x_i}^e = \sum_u^{q_1} j_u^e \sigma_u^z + \sum_{l,m} h_{l,m} \sigma_m^z \sigma_l^z,$$

wherein $\sigma^z$ is a Pauli-Z operator, and $h_{l,m}$ may be defined as a function that depends on the encoded sample values $j_u^e$. For instance, of such an embodiment $h_{l,m}$ is determined by computing an absolute mean of the $j_u^e$ values.

In another embodiment $h_{l,m}$ may be any mathematical function which is independent of the encoded sample values $j_u^e$. One example of such function is a constant function $h_{l,m}=1$.

Still referring to the processing step 604, it will be appreciated that there is more than one definitive way to construct the encoding Hamiltonian.

Still referring to the processing step 604, it will be appreciated that various types of Hamiltonian may be used as encoding Hamiltonian. For instance in one embodiment a Hamiltonian with three-degree interaction $\sigma^x\sigma^y\sigma^z$ wherein $\sigma^y$ is the Pauli-Y operation.

While it has been disclosed an embodiment, wherein processing step 602 is performed prior to processing step 604, it will be appreciated by the skilled addressee that those processing steps may be performed according to another order. Moreover, it will be appreciated that those processing steps may be performed in parallel.

According to processing step 606, a global Hamiltonian is generated.

It will be appreciated that the global Hamiltonian may be generated according to various embodiments. In one embodiment, the global Hamiltonian is generated by the digital computer. In another embodiment, the global Hamiltonian is generated by a remote processing device operatively connected with the digital computer.

It will be appreciated that the global Hamiltonian is generated using the first generated Hamiltonian and the second generated Hamiltonian.

More precisely and in accordance with an embodiment, the $q_1+q_2$-body global Hamiltonian $\overline{H}(t)$ is defined by:

$$\overline{H}(t)_{x_i}^e = a(t)H_i + b(t)\left(H_{x_i}^e + H_r^e + \sum_{\langle c,f \rangle} \overline{h}_{c,f}\sigma_c^z\sigma_f^z\right),$$

wherein $H_r^e$ is the first generated Hamiltonian and $H_{x_i}^e$ is the second generated Hamiltonian and a(t) and b(t) are classical external fields which drive the quantum system Hamiltonian $\overline{H}(t)_{x_i}^e$ over the time span [0,1] from an initial state at $t_i=0$ to a final state at $t_f=t$ wherein t≤T.

It will be appreciated that the term $\sum_{\langle c,f \rangle} \overline{h}_{c,f}\sigma_c^z\sigma_f^z$ denotes the interaction terms between the first generated Hamiltonian and the second generated Hamiltonian. It will be appreciated that the ⟨c, f⟩ goes over the subset of $q_1$ qubits that have pair-wise interactions with all or a subset of $q_2$ qubits.

According to processing step 608, the adiabatic quantum device is configured using the generated global Hamiltonian.

It will be appreciated that this processing step is performed by configuring accordingly the adiabatic quantum device using the global Hamiltonian generated.

Figure 7:
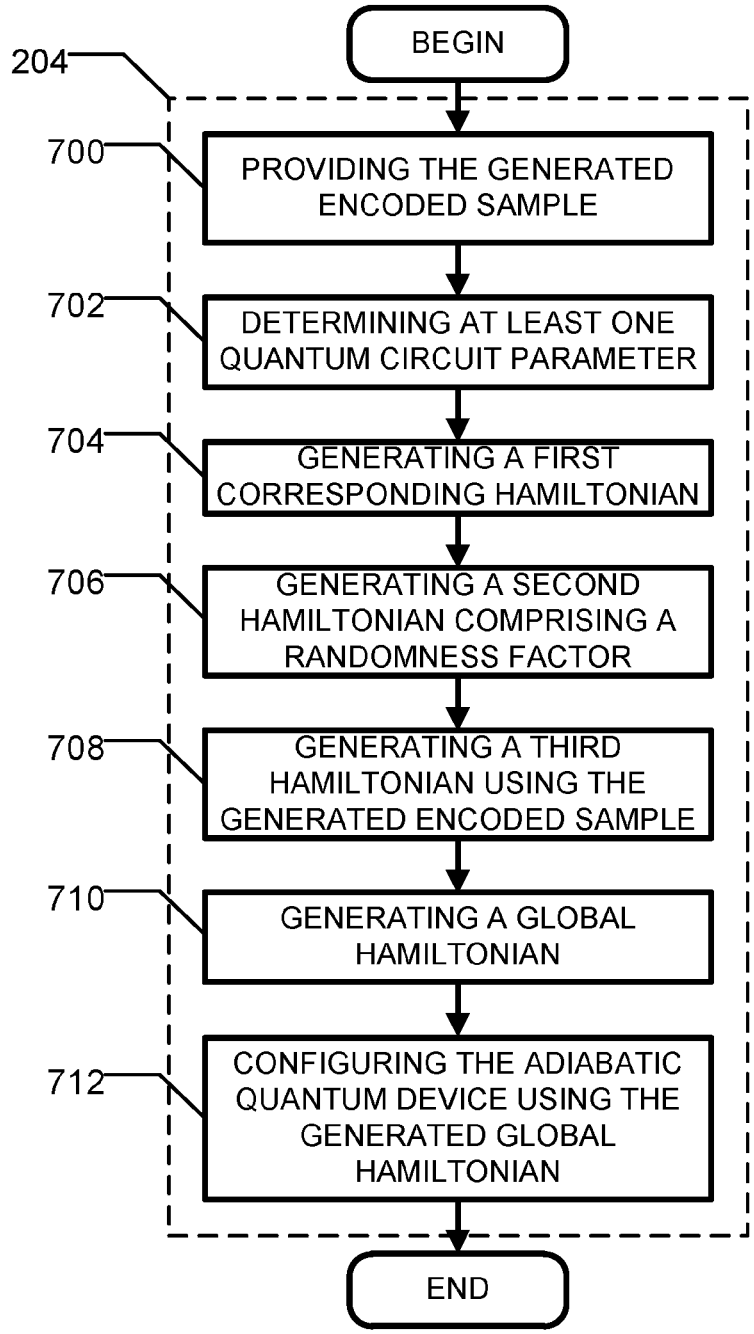
FIG. 7 is a flowchart which shows a third embodiment for configuring the adiabatic quantum device used in the method for mapping a dataset from a Hilbert space of a given dimension to a Hilbert space of a different dimension.

Now referring to FIG. 7, there is shown another embodiment for configuring the adiabatic quantum device.

It will be appreciated that in this embodiment, the method is able to adapt and learn quantum circuit parameters such that the performance of the machine learning algorithm on the randomized features is optimal as further explained. In fact and in order to perform the method disclosed a test is performed on previously generated data and at least one quantum circuit parameter is adjusted if need be.

More precisely and according to processing step 700, the generated encoded sample is provided.

It will be appreciated that the generated encoded sample is provided using the digital computer.

Still referring to FIG. 7 and according to processing step 702, at least one set of quantum circuit parameters is determined.

It will be appreciated that in one embodiment, the at least one set of quantum circuit parameters comprises two elements, referred to as α and β. It will be appreciated that any number of quantum circuit parameters may be used in an alternative embodiment.

Still referring to FIG. 7 and according to processing step 704, a first corresponding Hamiltonian is generated.

It will be appreciated that the first corresponding Hamiltonian may be generated according to various embodiments. In one embodiment, the first corresponding Hamiltonian is generated by the digital computer. In another embodiment, the first corresponding Hamiltonian is generated by a remote processing device operatively connected with the digital computer.

It will be appreciated that the first corresponding Hamiltonian has tunable couplings such that it is possible to steer the adiabatic quantum device towards a specific unitary operator which improves the performance of a machine learning algorithm used.

It will be appreciated that the first Hamiltonian is a $q_3$-body Ising model Hamiltonian defined by:

$$H_a^e = \sum_i^{q_3} \alpha_i\sigma_i^z + \sum_{\langle j,k \rangle}\beta_{j,k}\sigma_j^z\sigma_k^z,$$

wherein α and β are adaptive variables and a denotes the adaptiveness of the first Hamiltonian.

The skilled addressee will appreciate that various alternative embodiments may be possible for defining the first Hamiltonian.

In one embodiment, a Hamiltonian with three-degree interaction $\sigma^x\sigma^y\sigma^z$ where $\sigma^x$, $\sigma^y$, $\sigma^z$ are the Pauli-X, Pauli-Y, Pauli-Z operations, respectively, defines the first Hamiltonian.

In another embodiment, a Heisenberg model Hamiltonian defines the first Hamiltonian.

Still referring to FIG. 7 and according to processing step 706, a second Hamiltonian comprising a randomness factor is generated.

It will be appreciated that the second Hamiltonian comprising a randomness factor may be generated according to various embodiments. In one embodiment, the second Hamiltonian is generated by the digital computer. In another embodiment, the second Hamiltonian is generated by a remote processing device operatively connected with the digital computer.

It will be appreciated that the second Hamiltonian is a $q_2$-body Ising Hamiltonian H defined by:

$$H_r^e = \sum_g^{q_2} \overline{J}_g\sigma_g^z + \sum_{\langle k,w \rangle} \overline{h}_{k,w}\sigma_k^z\sigma_w^z$$

wherein r refers to a randomness of the circuit and $\overline{J}_g$ and $\overline{h}_{k,w}$ are real numbers drawn randomly from a classical probability distribution. For instance and in accordance with an embodiment, $\overline{J}_g$ and $\overline{h}_{k,w}$ are numbers drawn from the set {0,1,−1}. It will be appreciated that ⟨k, w⟩ goes over pair-wise interacting qubits meaning those qubits that directly interact with each other.

The skilled addressee will appreciate that various alternative embodiments may be possible for defining the second Hamiltonian.

In one embodiment, a Hamiltonian with three-degree interaction $\sigma^x\sigma^y\sigma^z$ wherein $\sigma^x$, $\sigma^y$, $\sigma^z$ are the Pauli-X, Pauli-Y, Pauli-Z operations, respectively, defines the second Hamiltonian.

In another embodiment, a Heisenberg model Hamiltonian defines the second Hamiltonian.

It will be appreciated by the skilled addressee that the second Hamiltonian does not depend on the data sample and only represents a randomness of the corresponding adiabatic quantum device.

Still referring to FIG. 7 and according to processing step 708, a third Hamiltonian is generated using the generated encoded sample.

It will be appreciated that the third Hamiltonian may be generated according to various embodiments. In one embodiment, the third Hamiltonian is generated by the digital computer. In another embodiment, the third Hamiltonian is generated by a remote processing device operatively connected with the digital computer.

It will be appreciated that the third Hamiltonian is generated by advantageously embedding an encoded sample into a $q_1$-body Hamiltonian H representative of an adiabatic quantum device and defined by:

$$H_{x_i}^e = \sum_u^{q_1} j_u^e\sigma_u^z + \sum_{l,m} h_{l,m}\sigma_m^z\sigma_l^z,$$

wherein $\sigma^z$ is a Pauli-Z operator and $h_{l,m}$ may be defined as a function that depends on the encoded sample values $j_u^e$. For instance, of such an embodiment $h_{l,m}$ is determined by computing an absolute mean of the $j_u^e$ values.

In another embodiment, $h_{l,m}$ may be any mathematical function which is independent of the encoded sample values $j_u^e$. One example of such function is a constant function $h_{l,m}=1$.

In another embodiment, $h_{l,m}$ may also be considered as adaptive parameters of the quantum circuit.

In another embodiment, $h_{l,m}$ may be drawn randomly from a well-defined probability distribution or a set of integer numbers $\{1,0,1\}$.

Still referring to the processing step 708, it will be appreciated by the skilled addressee that there is more than one definitive way to construct the encoding Hamiltonian.

Still referring to the processing step 708, it will be appreciated that various types of Hamiltonian may be used as encoding Hamiltonian, such as for instance and in one embodiment a Hamiltonian with three-degree $\sigma^x \sigma^y \sigma^z$, wherein $\sigma^x$, $\sigma^y$, $\sigma^z$ are the Pauli-X, Pauli-Y, Pauli-Z operations.

While it has been disclosed an embodiment, wherein processing step 704 is performed prior to processing step 706 and further wherein processing step 706 is performed prior processing step 708, it will be appreciated by the skilled addressee that those processing steps may be performed according to any other order. Moreover, it will be appreciated that at least one of those processing steps may be performed in parallel.

According to processing step 710, a global Hamiltonian is generated.

It will be appreciated that the global Hamiltonian may be generated according to various embodiments. In one embodiment, the global Hamiltonian is generated by the digital computer. In another embodiment, the global Hamiltonian is generated by a remote processing device operatively connected with the digital computer.

It will be appreciated that the global Hamiltonian may be generated using different combination of the first, second and third generated Hamiltonian.

For instance, and in accordance with an embodiment, the global Hamiltonian is the sum of only the first generated Hamiltonian and the last generated Hamiltonian.

It will be appreciated that the global Hamiltonian is generated using the first generated Hamiltonian, the second generated Hamiltonian and the third Hamiltonian.

More precisely and in accordance with an embodiment wherein the global Hamiltonian is defined as the sum of the first, the second and the third generated Hamiltonians. It is defined by:

$$\hat{H}(t)_{x_i}^e = a(t)H_i + b(t)\left(H_{x_i}^e + H_r^e + H_a^e + \sum_{\langle j',k' \rangle} \bar{h}_{j',k'} \sigma_{j'}^z \sigma_{k'}^z\right)$$

wherein $H_a^e$ is the first generated Hamiltonian, $H_r^e$ is the second generated Hamiltonian, $H_{x_i}^e$ is the third generated Hamiltonian and a(t) and b (t) are classical external fields which drive the quantum system Hamiltonian $\hat{H}(t)_{x_i}^e$ over the time span [0, T].

It will be appreciated that $\Sigma_{\langle j',k' \rangle} \bar{h}_{j',k} \sigma_j^z \sigma_k^z$ denotes the interaction terms between the various Hamiltonians and $\langle j', k' \rangle$ goes over the subject $q_3$ qubits which interact with all or a subset of $q_1+q_2$ qubits.

According to processing step 712, the adiabatic quantum device is configured using the generated global Hamiltonian.

It will be appreciated that this processing step is performed by configuring accordingly the adiabatic quantum device using the global Hamiltonian generated.

Now referring back to FIG. 2 and according to processing step 206, the adiabatic quantum device is caused to evolve.

According to processing step 208, a final state is measured.

It will be appreciated that the final state may be measured according to various embodiments.

In one embodiment, the final state is measured using the digital computer operatively coupled to the adiabatic quantum device.

More precisely, in the case of the embodiment disclosed in FIG. 5, the final state is measured by performing a projective measurement along the z-axis at the end of the evolution, i.e., $t=t_f$ where $t_f<T$.

In the case of the embodiment disclosed in FIG. 6, the final state is measured by performing a projective measurement along the z-axis at the end of the evolution $t_f$ on all or a subset q' of the total $q_1+q_2$ qubits.

In the case of the embodiment disclosed in FIG. 7, the final state is measured by performing a projective measurement along the z-axis at the end of the evolution, i.e., $t_f$ on all or a subset q" of the total $q_1+q_2+q_3$ qubits.

According to processing step 210, a test is performed in order to find out if there is an episode left.

In fact, it will be appreciated that an episode can also be referred to as a repetition of the processing steps 204, 206 and 208 for a given data sample $x_i$.

It will be appreciated that a large number of episodes will enable transformation of a data point to a large-dimension hyperspace. In a typical, non-limiting, example the number of repetitions is equal to 10000.

In the case where there is at least one episode left and according to processing step 202, an encoded sample is generated for the given data sample $x_i$.

It will be appreciated that in the embodiment wherein the adiabatic quantum device is configured according to the embodiment disclosed in FIG. 6, new set of random numbers are assigned to $\bar{J}_g$ and $\bar{h}_{k,w}$. In one embodiment, the new set of random numbers is assigned using the digital computer. It will be appreciated by the skilled addressee that various alternative embodiments may be possible.

It will be appreciated that in the embodiment wherein the adiabatic quantum device is configured according to the embodiment disclosed in FIG. 7, new set of random numbers are assigned to $\bar{J}_g$ and $\bar{h}_{k,w}$. In one embodiment, the new set of random numbers is assigned using the digital computer. It will be appreciated by the skilled addressee that various alternative embodiments may be possible.

In the case where no episode is left and according to processing step 212, a corresponding binary vector representative of the given data sample $x_i$ is generated. It will be appreciated that the corresponding binary vector is representative of the given data sample $x_i$ in a transformed Hilbert space and is generated using the determined value of each qubit after evolving the adiabatic quantum device at each episode e. Each generated binary vector corresponds to a mapped data sample.

It will be appreciated that the corresponding binary vector representative of the given data sample may be generated according to various embodiments. In one embodiment, the corresponding binary vector representative of the given data sample is generated by the digital computer. In another embodiment, the corresponding binary vector representative of the given data sample is generated by a remote processing device operatively connected with the digital computer.

Moreover, it will be appreciated that the corresponding binary vector representative of the given data sample $x_i$ depends on how the adiabatic quantum device was configured.

For instance and in the case where the adiabatic quantum device is configured according to FIG. 5 the corresponding binary representative of the given data sample $x_i$ is generated by stacking each final state measurement obtained for each episode. The skilled addressee will appreciate that this will result in a (q×e)dimensional vector $u_i$.

In the case where the adiabatic quantum device is configured according to FIG. 6, the corresponding binary representative of the given data sample $x_i$ is generated by stacking each final state measurement obtained for each episode. The skilled addressee will appreciate that this will result in a (q'×e) dimensional vector $u_i$.

In the case where the adiabatic quantum device is configured according to FIG. 7, the corresponding binary representative of the given data sample $x_i$ is generated by stacking each final state measurement obtained for each episode. The skilled addressee will appreciate that this will result in a (q"×e) dimensional vector $u_i$. This vector can be referred as a mapped data sample of a corresponding data sample.

According to processing step 214, a test is performed in order to find out if there is at least one data sample $x_i$ left in the dataset comprising n samples.

In the case where there is at least one data sample left and according to processing step 202, an encoded sample is generated for a given data sample of the at least one data sample left in the dataset. This will lead in a first episode to be performed for that specific data sample.

In the case where no data sample is left and according to processing step 216, a mapped dataset is provided. It will be appreciated that the mapped dataset is comprised of each of the plurality of mapped data samples. As mentioned previously, each mapped data sample is represented by a corresponding binary vector. The mapped dataset therefore comprises each of the generated corresponding binary vectors.

It will be appreciated that the mapped dataset may be provided according to various embodiments.

In one embodiment, the mapped dataset is provided by the digital computer. In another embodiment, the mapped dataset is provided by a remote processing device operatively connected with the digital computer.

The providing may further comprise at least one of storing the mapped dataset and transmitting the mapped dataset. For instance and in a non-limiting example, the mapped dataset may be stored in the memory unit of the digital computer. In another non-limiting example, the mapped dataset is transmitted to another processing device. It can then be stored locally or used by a given application using the mapped dataset. It will be further appreciated that the mapped dataset may alternatively be stored in a cloud and be then made accessible to multiple applications and users remotely.

It will be appreciated that in the case where the adiabatic quantum device is configured according to FIG. 6, the mapped dataset is used by a machine learning algorithm to perform a machine learning task. It will be appreciated that the machine learning task may be one of a supervised, unsupervised or use reinforcement learning.

If $F^i$ denotes the performance of the machine learning algorithm for a given dataset, a gradient-free optimizer is used for updating the values of the adaptive parameters $\alpha$, $\beta$ and $\theta$ with respect to the values of $F^i$. It will be appreciated that in one embodiment the adaptive parameters are initialized randomly. In another embodiment, the adaptive parameters are set by user to some non-random values. It will be appreciated that the iterations occur until the classical machine learning provides a satisfactory performance.

It will be appreciated by the skilled addressee that due to similarities between the method disclosed herein and a deep learning architecture, some techniques that are used in deep learning algorithms may be used in the method disclosed herein. In one embodiment, the dropout technique is used to overcome overfitting and to reduce complexity of the model. More precisely, some of the adaptive variables may be dropped out at random through the training process of the model using the AARQCL algorithm.

Now referring back to FIG. 4, it will be appreciated that the application for mapping a dataset from a Hilbert space of a given dimension to a Hilbert space of a different dimension 416 comprises instructions for obtaining a dataset D comprising n data samples $x_i$, $x_i \in \mathbb{R}^p$ for $i \in \{1,2,\ldots,n\}$, wherein p is the number of dimensions of each data sample. The application for mapping a dataset from a Hilbert space of a given dimension to a Hilbert space of a different dimension 416 further comprises instructions for, for each data sample $x_i$ of the dataset D, for a plurality of episodes e, generating an encoded sample $J_i = Ax_i + b$, wherein A is a q×p matrix comprising elements drawn from a first distribution, q is indicative of a number of qubits available in an adiabatic quantum device and b is a q-dimensional vector comprising elements drawn from a second distribution; configuring the adiabatic quantum device by embedding each encoded sample into a q-body Hamiltonian H representative of an adiabatic quantum device and defined by:

$$H(t)^e_{x_i} = a(t)H_i + b(t)H_f$$

wherein a(t) and b(t) are classical external fields driving the Hamiltonian H(t) over the time span [0,T], and $H_i$ is the initial Hamiltonian and $H_f$ is the final or encoding Hamiltonian defined by:

$$H_i = \sum_v^q \sigma_v^x, H_f = \sum_u^q j_u^e \sigma_u^z + \sum_{l,m} h_{l,m} \sigma_m^z \sigma_l^z$$

wherein $\sigma^x$, $\sigma^z$ are Pauli-X and Pauli-Z operators, respectively, and $h_{l,m}$ is a parameter which is defined as a function that depends on the encoded sample values $j_u^e$, causing the adiabatic quantum device to evolve from an initial state at $t_i=0$ to a final state at $t_f=t$ wherein $t \leq T$; and performing a projective measurement along z axis at the final state to determine a value of each qubit of the adiabatic quantum device; generating a corresponding binary vector representative of the given data sample $x_i$ in a transformed Hilbert space using the determined value of each qubit at each episode e; wherein each generated binary vector corresponds to a mapping of a corresponding data sample.

The application for mapping a dataset from a Hilbert space of a given dimension to a Hilbert space of a different dimension 416 further comprises instructions for providing a mapped dataset comprising each of the generated corresponding binary vectors.

It will be appreciated that a non-transitory computer readable storage medium is also disclosed for storing computer-executable instructions which, when executed, cause a digital computer to perform a method for mapping a dataset from a Hilbert space of a given dimension to a Hilbert space of a different dimension. The method comprises, obtaining a dataset D comprising n data samples $x_i$, $x_i \in \mathbb{R}^p$ for $i \in \{1, 2, \ldots, n\}$, wherein p is the dimension of each data sample; for each data sample $x_i$, of the dataset D, for a plurality of episodes e, generating an encoded sample $J_i = Ax_i + b$, wherein A is a q×p matrix comprising elements drawn from a first distribution, q is indicative of a number of qubits available in an adiabatic quantum device and b is a q-dimensional vector comprising elements drawn from a second distribution; configuring the adiabatic quantum device by embedding each encoded sample into a q-body Hamiltonian H representative of an adiabatic quantum device and defined by:

$$H(t)_{x_i}^e = a(t)H_i + b(t)H_f$$

Where a(t) and b(t) are classical external fields driving the Hamiltonian H(t) over the time span [0,T], and $H_i$ is the initial Hamiltonian and $H_f$ is the final or encoding Hamiltonian defined by:

$$H_i = \sum_v^q \sigma_v^x, \quad H_f = \sum_u^q j_u^e \sigma_u^z + \sum_{l,m} h_{l,m} \sigma_m^z \sigma_l^z$$

where $\sigma^x$, $\sigma^z$ are Pauli-X and Pauli-Z operators, respectively, and $h_{l,m}$ is a parameter which is defined as a function that depends on the encoded sample values $j_u^e$, causing the adiabatic quantum device to evolve from an initial state at $t_i = 0$ to a final state at $t_f = t$ wherein $t \leq T$; and performing a projective measurement along z axis at the final state to determine a value of each qubit of the adiabatic quantum device; generating a corresponding binary vector representative of the given data sample $x_i$ in a transformed Hilbert space using the determined value of each qubit at each episode e; wherein each generated binary vector corresponds to a mapping of a corresponding data sample; and providing a mapped dataset comprising each of the generated corresponding binary vectors.

It will be appreciated that there is also disclosed a method for training a machine learning model using an adiabatic quantum device. The method comprises obtaining a dataset D used for training a machine learning model. The method further comprises obtaining a machine learning model to train. The method further comprises mapping the obtained dataset D from a Hilbert space of a given dimension to a Hilbert space of a different dimension comprising a quantum feature space using one or more embodiments of the method disclosed above. The method further comprises training the obtained machine learning model using the mapped dataset.

It will be appreciated that there is also disclosed a method for performing a machine learning task, the method comprising providing a machine learning model trained according to the method disclosed above and using the machine learning model trained for performing the machine learning task.

It will be appreciated that the one or more embodiments of the method for mapping a dataset from a Hilbert space of a given dimension to a Hilbert space of a different dimension disclosed herein are of great advantage for various reasons.

An advantage of one or more embodiments of the method for mapping a dataset from a Hilbert space of a given dimension to a Hilbert space of a different dimension disclosed is that they transform the dataset such that using the transformed dataset, a machine learning practitioner is able to perform the needed machine learning operation using much less complex machine learning model. Using less complex machine learning model translates to faster training and execution. Less complex machine learning models are less prone to overfitting, which is a significant challenge when using machine learning models for practical datasets.

Another advantage of one or more embodiments of the method for mapping a dataset from a Hilbert space of a given dimension to a Hilbert space of a different dimension disclosed is that the privilege of using simpler machine learning models enables the use of linear machine learning models. Linear models are transparent and enable the practitioner to decipher mathematical relationship between the output and the input. This is of utmost requirement in practical applications like finance and health. Complex machine learning models do not provide this capability.

Another advantage of one or more embodiments of the method for mapping a dataset from a Hilbert space of a given dimension to a Hilbert space of a different dimension disclosed is that they use quantum correlation, such as quantum entanglement or quantum superposition, to map data from one space to another.

Another advantage of one or more embodiments of the method for mapping a dataset from a Hilbert space of a given dimension to a Hilbert space of a different dimension disclosed is that different types of distributions may be used for encoding data points into the quantum Hamiltonian, so that the learning performance may be enhanced.

Another advantage of one or more embodiments of the method for mapping a dataset from a Hilbert space of a given dimension to a Hilbert space of a different dimension disclosed is that they may also be used as an explicit kernel when one gets the inner product of the transformed data points, so kernel based machine learning algorithms may be used as well.

It will be further appreciated that one or more embodiments of the method disclosed herein may be used for various applications.

For instance, the one or more embodiments of the disclosed method for mapping a dataset from a Hilbert space of a given dimension to a Hilbert space of a different dimension may be used for performing a classification task, in particular to classify pictures of cats versus pictures of dogs. Assuming that each of the pictures can be represented by a vector x, then one or more embodiments of the method disclosed herein can be used to transform each of the vectors to a new Hilbert space, such that using a classical machine learning method on the transformed data samples may classify dogs versus cats with high accuracy.

The invention claimed is:

1. A computer-implemented method for mapping a dataset from a Hilbert space of a given dimension to a Hilbert space of a different dimension, the method comprising:
  (a) obtaining a dataset D comprising n data samples $x_i$, $x_i \in \mathbb{R}^p$ for $i \in \{1, 2, \ldots, n\}$, wherein p is a dimension of each data sample;
  (b) for each of n data samples $x_i$ of the dataset D,
    (i) for a plurality of episodes e,
      (A) generating an encoded sample $J_i = Ax_i + b$, wherein A is a q×p matrix comprising elements drawn from a first distribution, wherein q is indicative of a number of qubits available in an adiabatic quantum device, and wherein b is a q-dimensional vector comprising elements drawn from a second distribution;

(B) configuring the adiabatic quantum device by embedding the encoded sample into a q-body Ising Hamiltonian H representative of the adiabatic quantum device and defined by:

$$H(t)_{x_i}^e = a(t)H_i + b(t)H_f$$

wherein a(t) and b(t) are classical external fields driving a Hamiltonian H(t) over the time span [0,T], wherein $H_i$ is an initial Hamiltonian and $H_f$ is a final or an encoding Hamiltonian defined, respectively, by:

$$H_i = \sum_v^q \sigma_v^x, H_f = \sum_u^q j_u^e \sigma_u^z + \sum_{l,m} h_{l,m} \sigma_m^z \sigma_l^z$$

wherein $\sigma^x$, $\sigma^z$ are Pauli-X and Pauli-Z operators, respectively, and wherein $h_{l,m}$ is a parameter defined as a function that depends on values $j_u^e$ of the encoded sample;

(C) causing the adiabatic quantum device to evolve from an initial state at $t_i=0$ to a final state at $t_f=t$ wherein t≤T; and (D) performing a projective measurement along a z axis at the final state to determine a value of each qubit of the number of qubits of the adiabatic quantum device;

(ii) generating a corresponding binary vector representative of each data sample $x_i$ in a transformed Hilbert space using the value of each qubit at each episode e determined in (D), wherein the corresponding binary vector corresponds to a mapped data sample; and (c) providing a mapped dataset comprising each of the corresponding binary vectors generated in (ii).

2. The computer-implemented method as claimed in claim 1, wherein the first distribution comprises a parametrized probability distribution; further wherein the elements of the matrix A are drawn from the first distribution using one of a digital computer and a quantum computer.

3. The computer-implemented method as claimed in claim 2, wherein the elements of the matrix A are drawn from the first distribution using the adiabatic quantum device, further wherein the parametrized probability distribution comprises parameters which parameters are parameters of the q-body Ising Hamiltonian representative of the adiabatic quantum device.

4. The computer-implemented method as claimed in claim 2, wherein the elements of the matrix A are drawn from the first distribution using a gate-model quantum computer, further wherein the parameterized probability distribution comprises parameters which parameters are parameters of quantum logic gates.

5. The computer-implemented method as claimed in claim 2, wherein the parametrized probability distribution comprises parameters which parameters are adaptive variables.

6. The computer-implemented method as claimed in claim 5, wherein the adaptive variables are drawn using a dropout technique.

7. The computer-implemented method as claimed in claim 1, wherein (a) comprises at least one operation selected from the group consisting of:

receiving the dataset from a user interacting with a digital computer, obtaining the dataset from a memory unit located in a digital computer, and obtaining the dataset from a remote processing device operatively connected with a digital computer.

8. The computer-implemented method as claimed in claim 1, wherein (B) further comprises:

computing a $q_2$-body Ising Hamiltonian for $q_2$ qubits of the adiabatic quantum device, the $q_2$-body Ising Hamiltonian comprising a randomness factor; and generating a global Hamiltonian comprising the q-body Ising Hamiltonian, the $q_2$-body Ising Hamiltonian, and interacting terms between the $q_2$-body Ising Hamiltonian and the q-body Ising Hamiltonian H;

wherein (B) is performed using the global Hamiltonian.

9. The computer-implemented method as claimed in claim 8, wherein (B) further comprises:

computing a $q_3$-body Ising Hamiltonian for $q_3$ qubits of the adiabatic quantum device, the $q_3$-body Ising Hamiltonian comprising at least two adaptive variables, and adding the $q_3$-body Ising Hamiltonian and interaction terms between the $q_3$-body Ising Hamiltonian, the $q_2$-body Ising Hamiltonian, and the q-body Ising Hamiltonian H to the global Hamiltonian;

wherein the at least two adaptive variables are updated based on a performance obtained using a machine learning algorithm applied on the mapped dataset generated in (c).

10. The computer-implemented method as claimed in claim 9, wherein the $q_3$-body Ising Hamiltonian is defined by $H_a^e = \Sigma_i \alpha_i \sigma_i^z + \Sigma_{<j,k>} \beta_{j,k} \sigma_j^z \sigma_k^z$, wherein the at least two adaptive variable comprise $\alpha$ and $\beta$, and wherein <j, k > goes over pair-wise interacting qubits.

11. The computer-implemented method as claimed in claim 10, wherein the adaptive variables are drawn using a dropout technique.

12. The computer-implemented method as claimed in claim 9, wherein the adaptive variables are drawn using a dropout technique.

13. The computer-implemented method as claimed in claim 8, wherein the $q_2$-body Ising Hamiltonian is defined by $H_r^e = \Sigma_g {}^{q_2} \bar{J}_g \sigma_g^z + \Sigma_{<k,w>} \bar{h}_{k,w} \sigma_k^z \sigma_w^z$, wherein r is a randomness factor, $\bar{J}_g$ and $\bar{h}_{k,w}$ are real numbers, and <k, w> goes over pair-wise interacting qubits.

14. The computer-implemented method as claimed in claim 13, wherein the $\bar{J}_g$ and $\bar{h}_{k,w}$ are drawn randomly from a classical probability distribution.

15. The computer-implemented method as claimed in claim 14, wherein $\bar{J}_g$ and $\bar{h}_{k,w}$ are drawn randomly from {0,1,−1}.

16. The method of claim 8, wherein the dataset D is used for training a machine learning model, and wherein the method further comprises:

obtaining the machine learning model; and training the machine learning model using the mapped dataset.

17. The computer-implemented method as claimed in claim 1, wherein is equal to an absolute mean of the values $j_u^e$ of the encoded sample.

18. The method of claim 1, wherein the dataset D is used for training a machine learning model, and wherein the method further comprises:

obtaining the machine learning model; and training the machine learning model using the mapped dataset, thereby generating a trained machine learning model.

19. The method of claim 18, further comprising: performing a machine learning task using the trained machine learning model.

20. A digital computer operatively connected to an adiabatic quantum device via a communication port, the digital computer comprising:
a central processing unit; and
a memory unit comprising instructions which when executed by the central processing unit are configured to implement a computer-implemented method for mapping a dataset from a Hilbert space of a given dimension to a Hilbert space of a different dimension, the computer-implemented method comprising:
(a) obtaining a dataset D comprising n data samples $x_i$, $x_i \in \mathbb{R}^p$ for $i \in \{1,2,\ldots, n\}$, wherein p is a dimension of each data sample;
(b) for each of n data samples $x_i$ of the dataset D,
(i) for a plurality of episodes e,
(A) generating an encoded sample $J_i = Ax_i + b$, wherein A is a q×p matrix comprising elements drawn from a first distribution, wherein q is indicative of a number of qubits available in an adiabatic quantum device, and wherein b is a q-dimensional vector comprising elements drawn from a second distribution;
(B) configuring the adiabatic quantum device by embedding the encoded sample into a q-body Hamiltonian H(t) representative of an adiabatic quantum device and defined by:

$$H(t)^e_{x_i} = a(t)H_i + b(t)H_f$$

wherein a(t) and b(t) are classical external fields driving a Hamiltonian H(t) over the time span [0,T], wherein $H_i$ is an initial Hamiltonian and $H_f$ is a final or an encoding Hamiltonian defined, respectively, by $$H_i = \sum_v^q \sigma_v^x, H_f = \sum_u^q j_u^e \sigma_u^z + \sum_{l,m} h_{l,m} \sigma_m^z \sigma_l^z$$

wherein $\sigma^x$, $\sigma^z$ are Pauli-X and Pauli-Z operators, respectively, and wherein $h_{l,m}$ is a parameter defined as a function that depends on values $j_u^e$ of the encoded sample;
(C) causing the adiabatic quantum device to evolve from an initial state at $t_i = 0$ to a final state at $t_f = t$ wherein $t \leq T$; and
(D) performing a projective measurement along a z axis at the final state to determine a value of each qubit of the number of qubits of the adiabatic quantum device;
(ii) generating a corresponding binary vector representative of each data sample $x_i$ in a transformed Hilbert space using the value of each qubit at each episode e determined in (D), wherein the corresponding binary vector corresponds to a mapped data sample; and
(c) providing a mapped dataset comprising each of the corresponding binary vectors generated in (ii).

\* \* \* \* \*